(12) United States Patent
Takagi

(10) Patent No.: US 9,229,672 B2
(45) Date of Patent: Jan. 5, 2016

(54) AUDITING SYSTEM AND METHOD FOR CONTROLLING THE SAME

(75) Inventor: Noriko Takagi, Soka-shi (JP)

(73) Assignee: Canon Kabushiki Kaisha, Tokyo (JP)

( * ) Notice: Subject to any disclaimer, the term of this patent is extended or adjusted under 35 U.S.C. 154(b) by 684 days.

(21) Appl. No.: 13/236,276

(22) Filed: Sep. 19, 2011

(65) Prior Publication Data

US 2012/0086966 A1  Apr. 12, 2012

(30) Foreign Application Priority Data

Oct. 7, 2010 (JP) .................. 2010-227550

(51) Int. Cl.
- *G06F 15/00* (2006.01)
- *G06F 3/12* (2006.01)
- *G03G 15/00* (2006.01)
- *G03G 21/02* (2006.01)
- *G06F 11/30* (2006.01)

(52) U.S. Cl.
CPC .......... *G06F 3/1288* (2013.01); *G03G 15/5083* (2013.01); *G03G 21/02* (2013.01); *G06F 3/1207* (2013.01); *G06F 3/1273* (2013.01); *G06F 11/3013* (2013.01); *G06F 11/3072* (2013.01)

(58) Field of Classification Search
CPC .............................. H04N 2201/0094
USPC ......................................... 358/1.13
See application file for complete search history.

(56) References Cited

U.S. PATENT DOCUMENTS

| | | | | |
|---|---|---|---|---|
| 2002/0042881 | A1* | 4/2002 | Okigami | 713/200 |
| 2007/0133054 | A1 | 6/2007 | Kobayashi | |
| 2008/0266601 | A1* | 10/2008 | Narukawa et al. | 358/1.15 |
| 2012/0005237 | A1* | 1/2012 | Obata | 707/798 |

FOREIGN PATENT DOCUMENTS

| | | |
|---|---|---|
| CN | 1983241 A | 6/2007 |
| CN | 101154071 A | 4/2008 |
| JP | 2002-116901 A | 4/2002 |
| JP | 2004-102549 A | 4/2004 |
| JP | 2007-166178 A | 6/2007 |
| JP | 2008-048161 A | 2/2008 |

* cited by examiner

Primary Examiner — Helen Q Zong
(74) Attorney, Agent, or Firm — Canon USA, Inc. IP Division

(57) ABSTRACT

An auditing system that stores job history information of a job to be executed by an image forming apparatus may include a setting unit and an acquisition unit. The setting unit sets page filtering conditions. In response to the page filtering conditions including a setting of a ratio of pages containing image data to be acquired to all pages included in the job to be executed by the image forming apparatus, the acquisition unit randomly acquires image data of a number of pages corresponding to the ratio, from the pages included in the job, as the job history information.

12 Claims, 23 Drawing Sheets

FIG.14

PAGE RANGE TO BE STORED

○ ALL

○ DESIGNATED CONSECUTIVE PAGES INCLUDING HEAD PAGE
PAGE DESIGNATED: [        ] PAGES

◉ RANDOM PAGES CORRESPONDING TO DESIGNATED RATE
RATE DESIGNATED: [ 30% ▽ ]

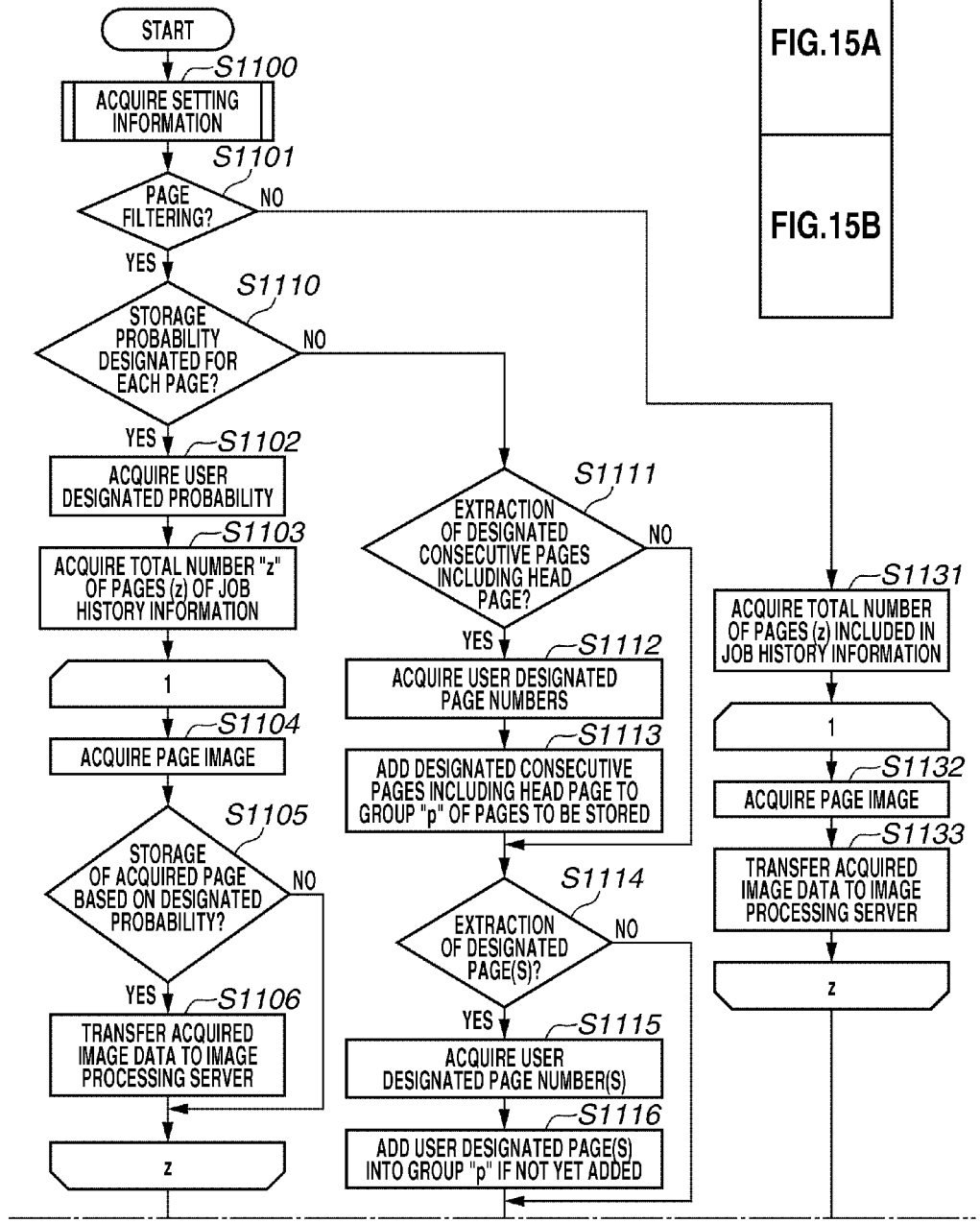
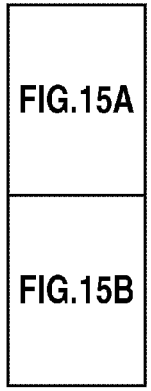
FIG.15

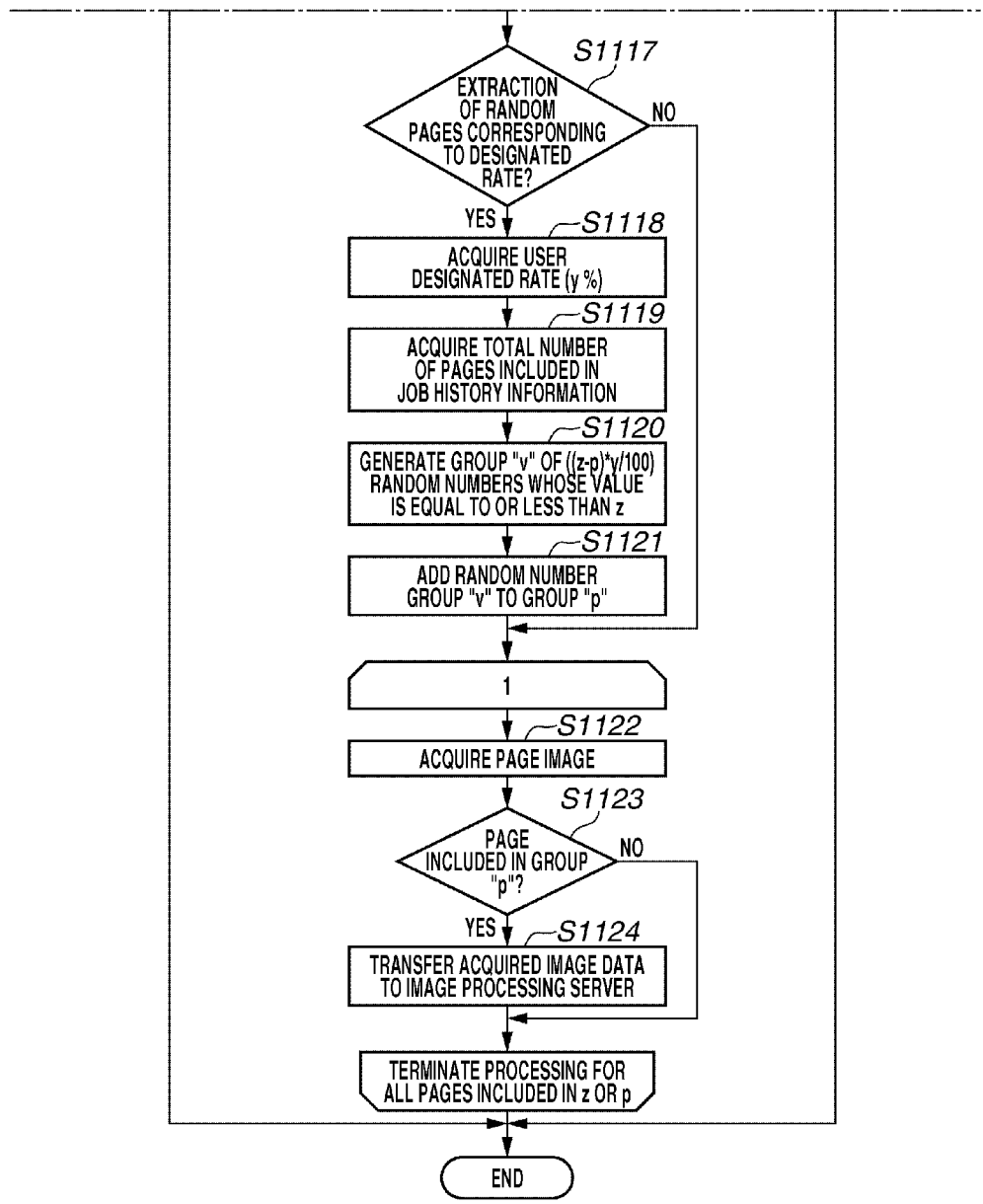

FIG.16

| PAGE RANGE TO BE STORED |
|---|

○ ALL

⦿ PERFORM PAGE FILTERING PROCESSING
  ☑ DESIGNATED CONSECUTIVE PAGES INCLUDING HEAD PAGE
    DESIGNATED CONSECUTIVE PAGES: [10]  PAGE(S)

☑ DESIGNATED PAGE(S)
    PAGE DESIGNATED: [20th, 30th, 40th, and 50th]  PAGE(S)

☑ RANDOM PAGES CORRESPONDING TO DESIGNATED RATE
    RATE DESIGNATED: [10% ▼]

☐ STORAGE PROBABILITY FOR EACH PAGE (EXCLUSIVE ITEM)
    PROBABILITY DESIGNATED: [50% ▼]

FIG.17

| SETTING OF GROUP 1 |
|---|

| SETTING OF USER BELONGING TO GROUP 1 | DESIGNATION OF USER |
|---|---|

STORAGE DESIGNATION FOR DAYS OF THE WEEK AND TIME PERIOD

MONDAY: ○ FULL TIME   ◉ DESIGNATED TIME PERIOD
TUESDAY: ○ FULL TIME   ◉ DESIGNATED TIME PERIOD
WEDNESDAY: ○ FULL TIME   ◉ DESIGNATED TIME PERIOD
THURSDAY: ○ FULL TIME   ◉ DESIGNATED TIME PERIOD
FRIDAY: ○ FULL TIME   ◉ DESIGNATED TIME PERIOD
SATURDAY: ◉ FULL TIME   ○ DESIGNATED TIME PERIOD
SUNDAY: ◉ FULL TIME   ○ DESIGNATED TIME PERIOD

| FULL TIME | | | | | | PAGE RANGE TO BE STORED |
|---|---|---|---|---|---|---|
| TIME PERIOD DESIGNATED | 21 : 00 ~ 8 : 30 | | PAGE RANGE TO BE STORED |
| | 8 : 30 ~ 12 : 00 | | PAGE RANGE TO BE STORED |
| | 12 : 00 ~ 13 : 00 | | PAGE RANGE TO BE STORED |
| | 13 : 00 ~ 21 : 00 | | PAGE RANGE TO BE STORED |

FIG.18

| USER NAME | GROUP NAME | DEPARTMENT NAME | MAIL ADDRESS | ... |
|---|---|---|---|---|
| USER A | GROUP 1 | SALES DEPARTMENT | userA@mail.ne.jp | ... |
| USER B | GROUP 1 | SALES DEPARTMENT | userB@mail.ne.jp | ... |
| USER C | GROUP 2 | PLANNING DEPARTMENT | userC@mail.ne.jp | ... |
| USER D | GROUP 3 | DEVELOPMENT DEPARTMENT | userD@mail.ne.jp | ... |
| USER E | GROUP 1 | SALES DEPARTMENT | userE@mail.ne.jp | ... |

FIG.19

[SETTING OF GROUP 1]

| DAYS OF THE WEEK | FULL-TIME RECORDING | TIME PERIOD 1 | TIME PERIOD 2 | TIME PERIOD 3 | TIME PERIOD 4 |
|---|---|---|---|---|---|
| MONDAY | NO | 21:00~08:30 | 8:30~12:00 | 12:00~13:00 | 13:00~21:00 |
| TUESDAY | NO | 21:00~08:30 | 8:30~12:00 | 12:00~13:00 | 13:00~21:00 |
| WEDNESDAY | NO | 21:00~08:30 | 8:30~12:00 | 12:00~13:00 | 13:00~21:00 |
| THURSDAY | NO | 21:00~08:30 | 8:30~12:00 | 12:00~13:00 | 13:00~21:00 |
| FRIDAY | NO | 21:00~08:30 | 8:30~12:00 | 12:00~13:00 | 13:00~21:00 |
| SATURDAY | YES | — | — | — | — |
| SUNDAY | YES | — | — | — | — |

FIG.20

[SETTING OF GROUP 1]

| TIME PERIOD DESIGNATED | STORAGE OF ALL PAGES | DESIGNATED CONSECUTIVE PAGES INCLUDING HEAD PAGE | | DESIGNATED PAGE(S) | | RANDOM PAGES CORRESPONDING TO DESIGNATED RATE | | STORAGE PROBABILITY FOR EACH PAGE | |
|---|---|---|---|---|---|---|---|---|---|
| | | CHOICE | PAGE | CHOICE | PAGE | CHOICE | RATE | CHOICE | PROBABILITY |
| FULL TIME | YES | NO | — | NO | — | NO | — | NO | — |
| TIME PERIOD 1 | YES | NO | — | NO | — | NO | — | NO | — |
| TIME PERIOD 2 | NO | NO | — | NO | — | YES | 10 | NO | — |
| TIME PERIOD 3 | NO | YES | 10 | YES | 20,30, 40,50 | YES | 10 | NO | — |
| TIME PERIOD 4 | NO | NO | — | NO | — | YES | 10 | NO | — |

AUDITING SYSTEM AND METHOD FOR CONTROLLING THE SAME

BACKGROUND OF THE INVENTION

1. Field of the Invention

The present invention relates to an auditing system that can record job history information (e.g., execution user, execution date and time, etc.) relating to a scan job, a copy job, or a print job having been executed by a digital multifunction peripheral.

2. Description of the Related Art

Due to recent developments in the techniques relating to various image forming apparatuses, such as printers and digital multifunction peripherals, it becomes easier for many users to print, copy, and transmit an original (i.e., a document to be processed). On the other hand, the improvements in usability have caused new problems, such as information leakage by the print, copy, and transmission of a confidential original (i.e., a confidential document).

To solve this problem, there is a conventional image forming apparatus that can store job history information in a storage device when the apparatus executes a print job, a copy job, a FAX job, or an electronic mail sending job.

For example, the job history information includes job executed user information, job executed date and time information, job executed digital multifunction peripheral information (e.g., IP address, serial number, etc.), and log attribute information indicating the type of an executed job. Further, the job history information may include image data of an input image and reduced image data of the image data.

The auditing system includes a job history information auditing server in addition to the above-described image forming apparatus. The job history information auditing server includes an image processing server, a data server, and a search server. The image processing server, the data server, and the search server can be arbitrarily combined and constructed on different information processing apparatuses (PCs) or can be constructed on the same PC.

The job history information recorded by the image forming apparatus is transmitted to the image processing server and stored in a database constructed on the data server. The job history information can be stored in the database for a predetermined period. The search server can search for job history information stored in the database based on search conditions designated by a user, and can notify a user of a search result. Thus, the auditing system can trace job history information in the event of the occurrence of any leakage of information.

The above-described image forming apparatus and the auditing system require a large-capacity storage area to store job history information of numerous jobs. To this end, there is a conventional method capable of reducing a required storage capacity to realize effective storage of a large amount of job history data.

For example, as discussed in Japanese Patent Application Laid-Open No. 2007-166178, the data amount to be stored in a database can be reduced beforehand by reducing the resolution of image data, selecting a part of image data, or reducing the number of colors of image data when the job history information is stored.

In particular, the selection of image data can be realized by selecting image data of page designation pages or randomly designated pages. Extracting and storing a part of the image data input during the execution of a job, as described above, is referred to as "page filtering" in the following description.

Preventing the leakage of information is one of the main purposes when users introduce the auditing system. To attain the goal, storing the image data of all pages is not essentially required and it will be sufficient if any unfair conduct can be detected by effectively performing sampling in the page filtering processing.

In a conventionally used auditing system, it is feasible to store image data of designated pages only. However, if the sampling is performed based on the regularity of a specific page or a specific number of pages, it may be difficult to obtain an appropriate result in the sampling. For example, a malicious user can execute a job in such a way as to leave nothing about the job history information, by using job data including confidential information as a page other than the specific page or the specific number of pages.

Further, when image data of randomly designated pages is stored, the number of extractable pages is fixed regardless of the size or the volume of a document. For example, even when the document is composed of 100 pages (or 1000 pages), image data of only 50 pages is randomly extracted and stored. Thus, according to this method, if a malicious user executes a job by embedding a small amount of confidential information somewhere in a large number of pages, the acquired job history information may not include any information usable to detect an information leakage. In this respect, the effect of suppressing the information leakage deteriorates significantly and the sampling may not obtain an appropriate result.

Further, when the page filtering processing is performed by the job history information auditing server, the network load may increase excessively because image data of a page not finally stored by the page filtering processing is also transmitted by the digital multifunction peripheral.

SUMMARY OF THE INVENTION

Embodiments of the present invention described herein are directed to a job history auditing system that can effectively sample image data to be stored in such a way as to prevent the storage capacity from reducing without reducing the information leakage suppression effect.

According to an aspect of the invention, an auditing system that stores job history information of a job to be executed by an image forming apparatus includes a setting unit for setting page filtering conditions, and an acquisition unit configured, if the page filtering conditions include a setting of a ratio of pages containing image data to be acquired to all pages included in the job to be executed by the image forming apparatus, to randomly acquire image data of a number of pages corresponding to the ratio, from the pages included in the job, as the job history information.

Further features and aspects of the present invention will become apparent from the following detailed description of embodiments with reference to the attached drawings.

BRIEF DESCRIPTION OF THE DRAWINGS

The accompanying drawings, which are incorporated in and constitute a part of the specification, illustrate embodiments, features, and aspects of the invention and, together with the description, serve to explain the principles of the invention.

FIG. 14 illustrates an example user interface that enables users to set operational conditions of page filtering processing when setting information input reception processing is performed according to the first embodiment of the present invention.

FIG. 15 includes FIGS. 15A and 15B and is a flowchart illustrating an example procedure of the page filtering and job history information transfer processing that can be performed by the digital multifunction peripheral according to a second embodiment of the present invention.

FIG. 16 illustrates an example user interface that enables users to set operational conditions of the page filtering processing when the setting information input reception processing is performed according to the second embodiment of the present invention.

FIG. 17 illustrates an example user interface that enables users to set operational conditions of the page filtering processing for each group when the setting information input reception processing is performed according to a third embodiment of the present invention.

FIG. 18 illustrates an example user list, which is stored in the data server, according to the third embodiment of the present invention.

FIG. 19 illustrates a setting example for each day of the week and time period, which is stored in the data server, according to the third embodiment of the present invention.

FIG. 20 illustrates an example page filtering setting for each time period, which is stored in the data server, according to the third embodiment of the present invention.

DESCRIPTION OF THE EMBODIMENTS

Various embodiments, features, and aspects of the invention will be described in detail below with reference to the drawings.

A first embodiment that can realize the present invention is described below with reference to the attached drawings. A job history information auditing server according to the present embodiment includes a plurality of information processing apparatuses (PCs) that are functionally operable as an image processing server, a data server, and a search server, respectively.

Figure 1:
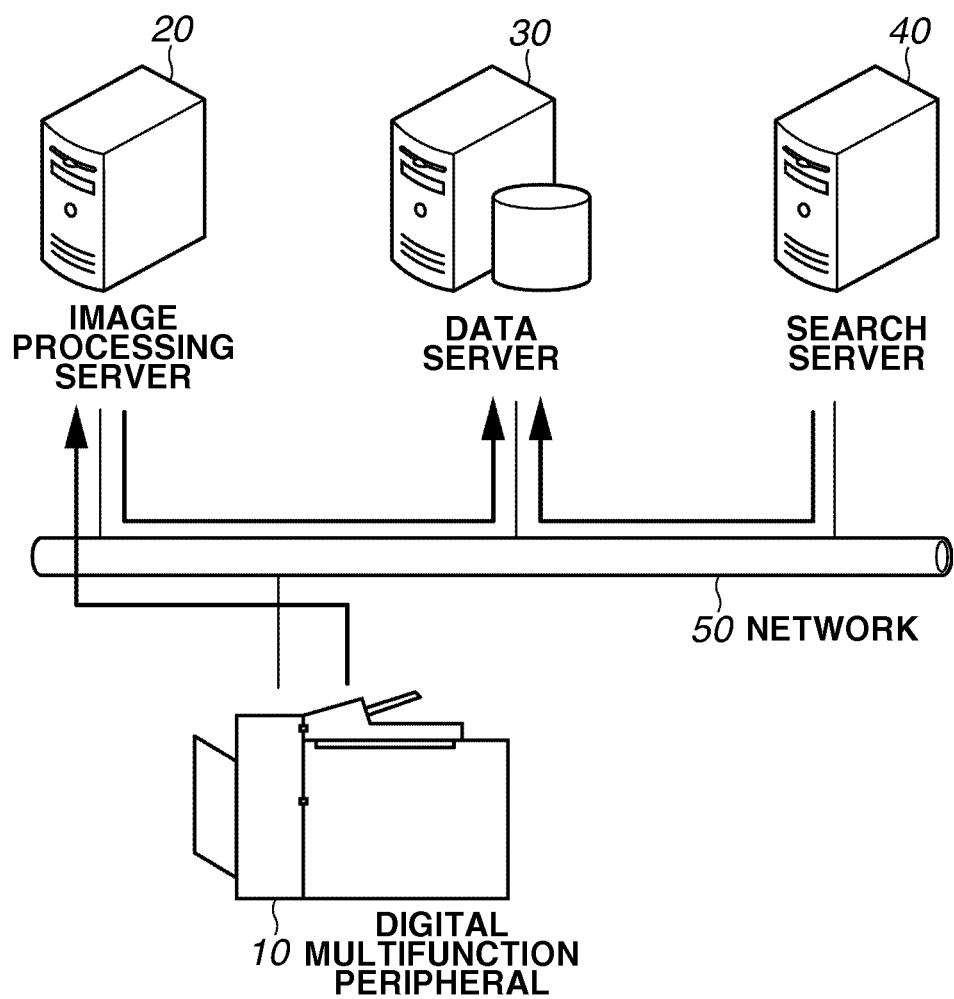
FIG. 1 illustrates an overall configuration of a job history information auditing system according to a first embodiment of the present invention.

FIG. 1 illustrates an overall configuration of a job history information auditing system according to the present embodiment. The job history information auditing system illustrated in FIG. 1 includes a digital multifunction peripheral 10, an image processing server 20, a data server 30, and a search server 40, which are connected via a network 50. In the present embodiment, the digital multifunction peripheral 10 is functionally operable as an image forming apparatus.

The digital multifunction peripheral 10 has scan, print, copy, electronic mail, and FAX functions. Further, the digital multifunction peripheral 10 is capable of recording job history information when a job has been executed by the device. The digital multifunction peripheral 10 temporarily stores job history information, when a job is executed, in a local storage area. The digital multifunction peripheral 10 transmits the job history information to the image processing server 20 in response to reception of a transmission instruction or at a predetermined transmission time.

The image processing server 20 can perform data conversion processing on job history information transmitted from the digital multifunction peripheral 10 and store the processed data in the data server 30. The data conversion processing to be performed by the image processing server 20 includes Optical Character Recognition (OCR) processing performed on image data to extract text information and conversion processing to convert a format of the image data.

The text information obtained by the data conversion processing is tied with the job history information and stored in the data server 30, so that the obtained text information can be used in the search of job history information.

The data server 30 stores the job history information (e.g., log attribute and image data) transmitted from the image processing server 20 together with the text information associated with the job history information. In the present embodiment, a database is present in the data server 30. Any other storage unit (such as a file system) is usable if it has the capability of storing the job history information.

The job history information stored in the data server 30 is deleted if a predetermined condition is satisfied. The predetermined condition is normally a storage period of the job history information. If a predetermined period has elapsed, the stored job history information is automatically deleted. It is useful to execute the deletion processing at predetermined timing (e.g., once a day).

The search server 40 can acquire, if search conditions are received from a user, job history information that corresponds to the received search conditions from the data server 30. The search server 40 notifies a user of the acquired job history information.

The search conditions include job attribute information (e.g., job executor, execution date and time, etc.) and any character string included in the text information. The search server 40 can search for target job history information stored in the data server 30 with reference to the designated search conditions.

In FIG. 1, each PC is functionally operable as an independent device. However, it is useful to provide a single PC that has functions similar to those of the servers 20, 30, and 40. Further, it is useful that the above-described functions are realized by an arbitrary combination of an appropriate number of PCs.

Figure 2:
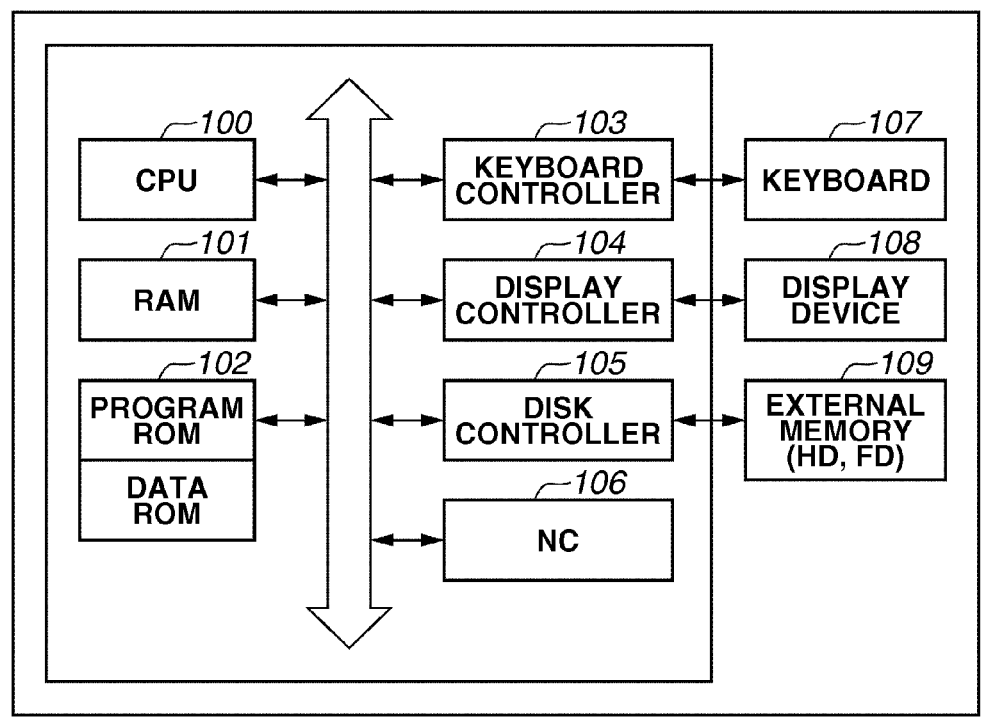
FIG. 2 is a block diagram illustrating a hardware configuration of an information processing apparatus according to the first embodiment of the present invention.

FIG. 2 illustrates a hardware configuration of a PC that can constitute each of the image processing server 20, the data server 30, and the search server 40 illustrated in FIG. 1. The hardware configuration illustrated in FIG. 2 corresponds to a hardware configuration of a general information processing apparatus. The hardware configuration of a general information processing apparatus is applicable to each PC described in the present embodiment.

In FIG. 2, a central processing unit (CPU) 100 can execute an operating system or an application program stored in a program ROM of a read only memory (ROM) 102, or loaded into a random access memory (RAM) 101 from a hard disk 109. Processing of each flowchart described in detail below can be realized by execution of the program. The RAM 101 is functionally operable as a main memory or a work area of the CPU 100. A keyboard controller 103 can control key information input via a keyboard 107 or a pointing device (not illustrated).

A display controller 104 can control the display of a display device 108. A disk controller 105 can control data access to the hard disk (HD) 109 or a floppy® disk (FD), which can store various types of data. A network controller (NC) 106 is connected to the network and can execute communication control processing for other devices connected to the network.

Figure 3:
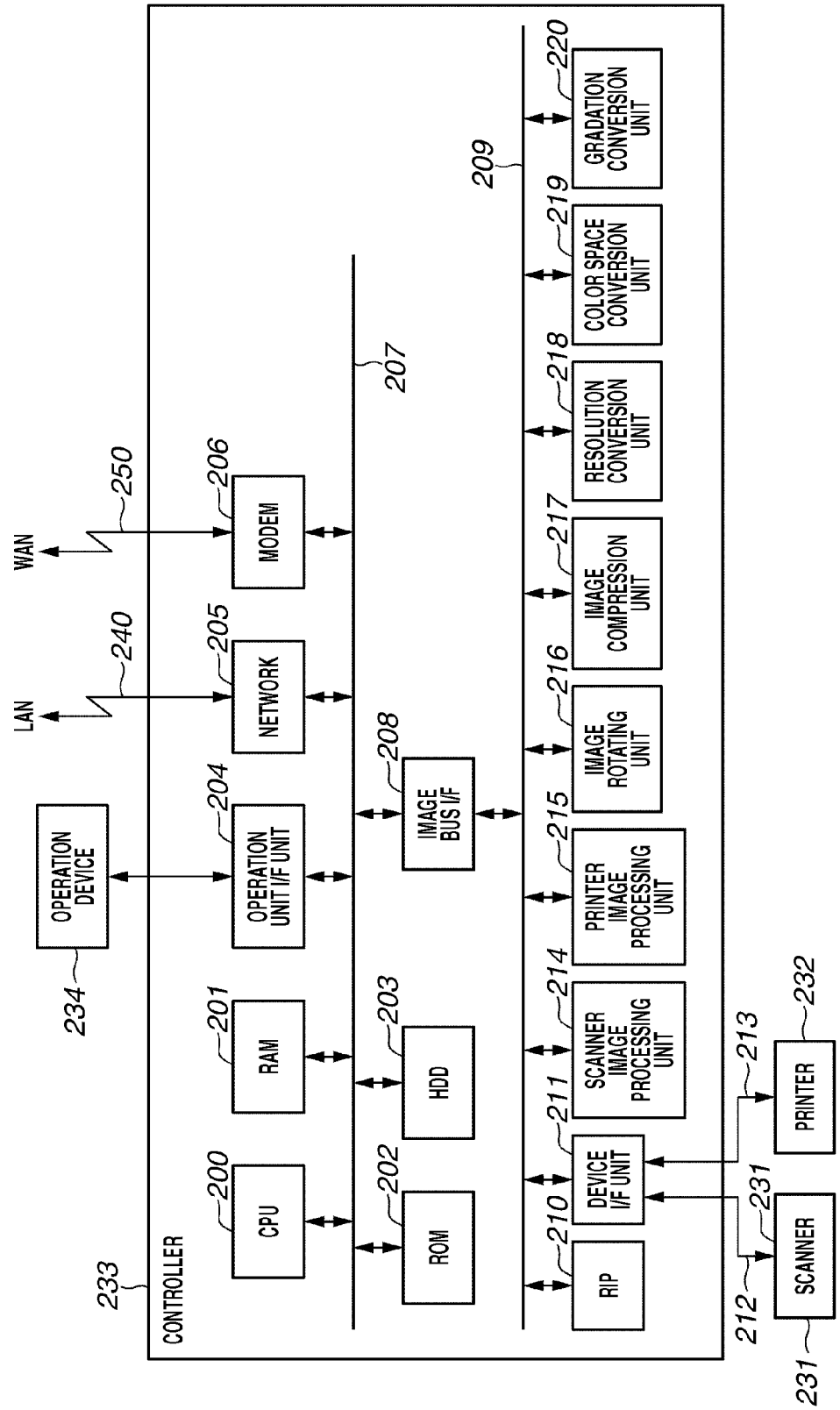
FIG. 3 is a block diagram illustrating an example configuration of a digital multifunction peripheral according to the first embodiment of the present invention.

FIG. 3 is a block diagram illustrating an example configuration of the digital multifunction peripheral 10 illustrated in FIG. 1. A controller 233 is connected to a scanner 231 and a printer 232. The scanner 231 is functionally operable as an image input device. The printer 232 is functionally operable as an image output device.

The controller 233 is further connected to a network (LAN) 240 and a public telephone line (WAN) 250, to input and output image data and device information. In the controller 233, a central processing unit (CPU) 200 can control various operations to be performed by the digital multifunction peripheral 10.

A random access memory (RAM) 201 is functionally operable as a system work memory for the CPU 200 when the CPU 200 is operating, and is functionally operable as an image memory (or a buffer memory) that can temporarily store input image data. A read only memory (ROM) 202 is a boot ROM that stores a boot program for the system.

A hard disk drive (HDD) 203 stores system software, job history information, and image data in each user box. An operation unit I/F unit 204 is an interface unit for an operation device 234. The operation unit I/F unit 204 can output screen data to the operation device 234 that can display the received screen data.

Further, if an operator enters information via the operation device 234, the operation unit I/F unit 204 can transmit the input information to the CPU 200. The operation device 234 can be an operation screen of the digital multifunction peripheral 10, or a remote screen (e.g., the display device 108) of an external device (e.g., PC) that can be provided by a program of the digital multifunction peripheral 10.

A network unit (Network) 205 is connected to the network (LAN) 240 to input and output information. A modem (MODEM) 206 is connected to the public telephone line (WAN) 250 to input and output image data. The above-described functional units 200 to 206 are mutually connected via a system bus 207. An image bus (Image Bus) I/F 208 is a bus bridge that connects the system bus 207 to an image bus 209. The image bus 209 can speedily transmit image data. The image bus I/F 208 can convert a data structure of an image. The following devices are mutually connected via the image bus 209.

A raster image processor (RIP) 210 can rasterize a PDL code into a bitmap image. The scanner 231 and the printer 232 (i.e., the image input/output devices) are connected to a device I/F unit 211 of the controller 233 via an image input unit interface 212 and a printing unit interface 213, respectively.

The device I/F unit 211 can convert image data. A scanner image processing unit 214 can perform correction, modification, and editing processing on input image data.

Further, the scanner image processing unit 214 can determine whether the input image data is a color original (i.e., a document to be processed) or a monochrome original based on a saturation signal of the image data and can store a detected result. A printer image processing unit 215 can perform correction, modification, and editing processing on output image data.

An image rotating unit 216 can rotate image data in cooperation with the scanner image processing unit 214 when an image is read by the scanner 231. The image rotating unit 216 can store the rotated image data in a memory. Further, the image rotating unit 216 can rotate image data stored in the memory and store the rotated image data in the memory. Further, the image rotating unit 216 and the printer image processing unit 215 can cooperatively rotate image data stored in the memory and print an image on an output medium based on the rotated image data.

An image compression unit 217 can perform JPEG compression/decompression processing on multi-valued image data and can perform JBIG, MMR, MR, or MH processing on binary image data. A resolution conversion unit 218 can perform resolution conversion processing on image data stored in the memory and store the processed image data in the memory. A color space conversion unit 219 can convert YUV image data (i.e., data stored in the memory) into Lab image data based on a matrix calculation, and can store the converted image data in the memory.

A gradation conversion unit 220 can perform error diffusion processing to convert, for example, 8-bit image data having 256 gradation levels (e.g., image data stored in the memory) into 1-bit image data having two gradation levels. The gradation conversion unit 220 can store the converted image data in the memory.

The image rotating unit 216, the image compression unit 217, the resolution conversion unit 218, the color space conversion unit 219, and the gradation conversion unit 220 can operate in cooperation with each other. For example, the processing for rotating image data stored in the memory and the processing for converting the resolution of image data can be simultaneously performed without any intervention of the memory.

Figure 4:
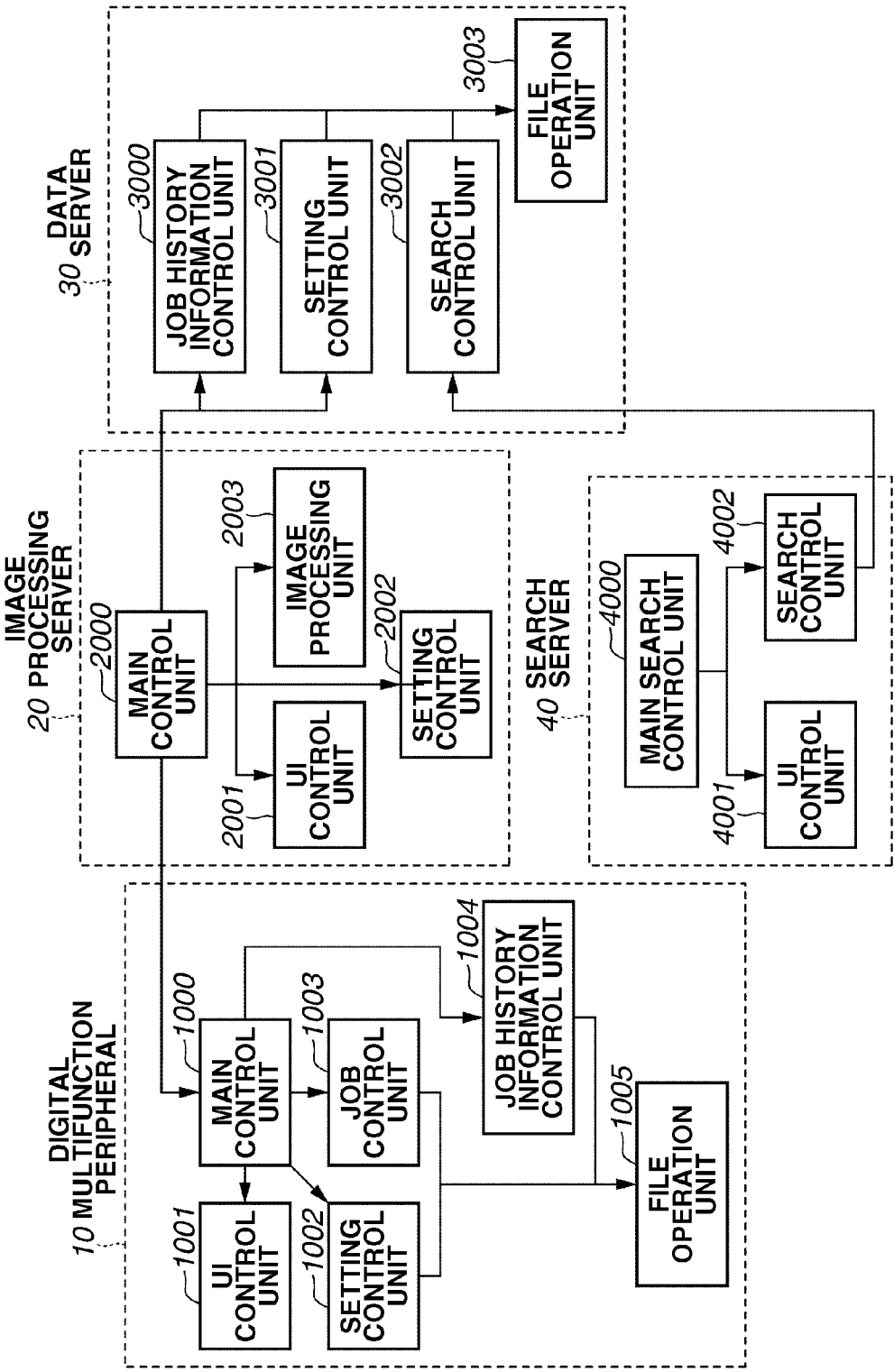
FIG. 4 is a block diagram illustrating an example software configuration of the job history information auditing system according to the first embodiment of the present invention.

FIG. 4 is a block diagram illustrating an example of a software configuration of the digital multifunction peripheral 10, the image processing server 20, the data server 30, and the search server 40, which cooperatively constitute the job history information auditing system. The digital multifunction peripheral 10 includes a main control unit 1000, a UI control unit 1001, a setting control unit 1002, a job control unit 1003, a job history information control unit 1004, and a file operation unit 1005.

The main control unit 1000 can control various operations to be performed by the digital multifunction peripheral 10, and can perform instruction and management processing for other functional units constituting the digital multifunction peripheral 10. Further, according to user instruction content from the UI control unit 1001, the main control unit 1000 sends a setting control instruction to the setting control unit 1002, sends a job execution instruction to the job control unit 1003, and sends a job history information control instruction to the job history information control unit 1004.

The UI control unit 1001 can control overall processing to be performed by the digital multifunction peripheral 10 in response to each user operation. More specifically, the UI control unit 1001 can display a user interface on the operation device 234 of the digital multifunction peripheral 10 or on a remote screen (e.g., the display device 108) of an external device (e.g., PC). Further, the UI control unit 1001 sends the content of an instruction, if received from a user, to the main control unit 1000.

The setting control unit 1002 can control operational condition setting information relating to the digital multifunction peripheral 10. The setting control unit 1002 receives a setting instruction of operational conditions from the UI control unit 1001, via the main control unit 1000. The setting control unit 1002 can perform setting information reference and storage processing via the file operation unit 1005. In the present embodiment, to increase the processing speed efficiently in referring to the setting information, the setting control unit 1002 is configured to store the setting information in the RAM 201.

In the present embodiment, the setting information stored in the RAM 201 can be updated when the setting instruction is received from the UI control unit 1001, or can be updated at any other appropriate timing. For example, it is useful to update the setting information stored in the RAM 201 when a latest information acquisition request is sent to the image processing server 20 every five minutes.

Further, it is useful to provide a mechanism capable of updating the setting information stored in the RAM 201 in response to a detected update of the setting information stored in the data server 30 via a main control unit 2000 of the image processing server 20.

The job control unit 1003 can receive a user instruction via the main control unit 1000 and execute a designated job. In this case, via the main control unit 1000, the job control unit 1003 instructs the job history information control unit 1004 to store job history information.

The file operation unit 1005 is a control unit that can control setting information, image data, and, job history information input to and output from the HDD 203 and can execute processing in response to a processing request from each unit. The job history information control unit 1004 generates job history information, when a job is executed, according to an instruction from the main control unit 1000. Then, the job history information control unit 1004 stores the generated job history information via the file operation unit 1005. In the present embodiment, the file operation unit 1005 performs page filtering processing.

The image processing server 20 includes the main control unit 2000, a UI control unit 2001, a setting control unit 2002, and an image processing unit 2003. The main control unit 2000 can control various operations to be performed by the image processing server 20 and perform instruction and management processing for other functional units constituting the image processing server 20.

The UI control unit 2001 can display a user interface on the display device 108 of the image processing server 20 to receive a user instruction entered via the keyboard 107 of the image processing server 20. The setting information designated by the user is stored, via the main control unit 2000, in the data server 30.

The setting control unit 2002 can control operational condition setting information relating to the image processing server 20. The setting control unit 2002 receives an operational condition setting instruction via the main control unit 2000 and stores the received setting information in the data server 30. The image processing unit 2003 can perform OCR processing and image format conversion processing on image data according to an instruction from the main control unit 2000.

The data server 30 includes a job history information control unit 3000, a setting control unit 3001, a search control unit 3002, and an operation unit 3003. The job history information control unit 3000 can receive a job history information reference and storage instruction via the main control unit 2000 of the image processing server 20, and can perform a job history information control according to the received instruction.

The setting control unit 3001 can perform a setting information control according to a reference and storage instruction relating to setting information of a configuration element, if received via the main control unit 2000 of the image processing server 20.

The search control unit 3002 can receive a search execution instruction together with search conditions from the search server 40 and can return a search result to the search server 40. The file operation unit 3003 can receive an instruction from each control unit of the data server 30 and can perform reference and storage processing for setting information and job history information stored in the HDD 109 of the data server 30. The operation unit 3003 can be replaced by an access to an appropriate database.

The search server 40 includes a main search control unit 4000, a UI control unit 4001, and a search control unit 4002. The main search control unit 4000 can control various operations to be performed by the search server 40 and perform instruction and management processing for other functional units constituting the search server 40.

The UI control unit 4001 can cause the display device 108 of the search server 40 to display a user interface to enable users to set search conditions. The UI control unit 4001 receives search conditions, if entered from a user, via the keyboard 107 of the search server 40. The received search conditions are sent to the search control unit 4002 via the main search control unit 4000. Further, via the user interface, the UI control unit 4001 notifies a user of the search result received from the search control unit 4002 via the main search control unit 4000.

The search control unit 4002 can control search processing. The search control unit 4002 sends a search instruction to the search control unit 3002 of the data server 30 based on the search conditions received from the main search control unit 4000. Then, the search control unit 4002 receives a search result from the search control unit 3002. Further, the search control unit 4002 sorts a search result, if necessary, and sends the search result to the main search control unit 4000.

Figure 5:
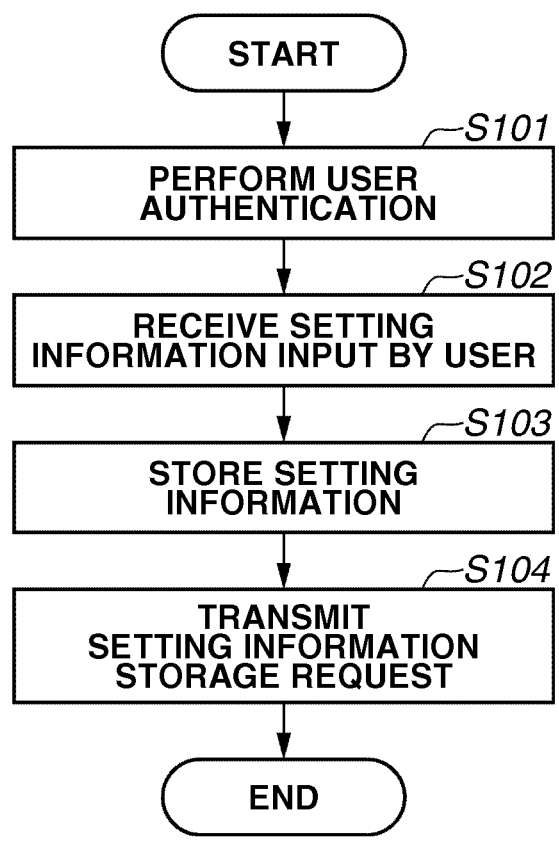
FIG. 5 is a flowchart illustrating an example procedure of setting information setting processing that can be performed by the digital multifunction peripheral according to the first embodiment of the present invention.

FIG. 5 is a flowchart illustrating an example procedure of processing for setting operational conditions to control the digital multifunction peripheral 10, as setting information, when the digital multifunction peripheral 10 performs various processing (e.g., job history information transmission, page filtering, etc.).

In step S101, the main control unit 1000 performs user authentication via the UI control unit 1001. The user authentication is a well-known technique and is not described in detail below. Alternatively, the main control unit 1000 can access an external authentication server to perform authentication. Further, if user information is locally stored in any one of the digital multifunction peripheral 10, the image processing server 20, and the data server 30, the main control unit 1000 can perform authentication based on the stored user information (although not illustrated).

In step S102, the main control unit 1000 causes the UI control unit 1001 to display a setting screen and receives input information entered by a user via the operation device 234 or the display device 108 of a remotely connected PC. The setting control unit 1002 receives the input setting information via the main control unit 1000 and stores the setting information in the RAM 201. In this case, a setting item relating to the page filtering, which has been input as part of the setting information, is described in detail below with reference to an example illustrated in FIG. 14.

In step S103, the setting control unit 1002 stores the setting information in the HDD 203 via the file operation unit 1005. In step S104, the setting control unit 1002 transmits, via the main control unit 1000, a setting information storage request to the image processing server 20. In this case, the setting information storage request transmitted in step S103 includes the setting information having been input in step S102.

Figure 6:
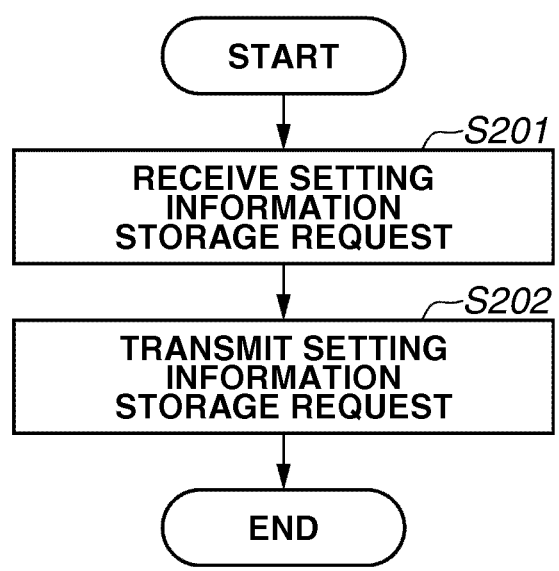
FIG. 6 is a flowchart illustrating an example procedure of processing that can be performed by an image processing server to receive a setting information storage request from the digital multifunction peripheral according to the first embodiment of the present invention.

FIG. 6 is a flowchart illustrating an example procedure of processing that can be performed by the image processing server 20 to receive the setting information storage request from the digital multifunction peripheral 10.

In step S201, the main control unit 2000 receives the setting information storage request from the main control unit 1000 of the digital multifunction peripheral 10.

In step S202, the main control unit 2000 transmits the received setting information storage request to the setting control unit 3001 of the data server 30. Although not illustrated in the drawings, the setting control unit 3001 of the data server 30 extracts the setting information included in the setting storage request received from the image processing server 20, via the file operation unit 3003, and stores the extracted setting information in the HDD 109 of the data server 30.

Figure 7:
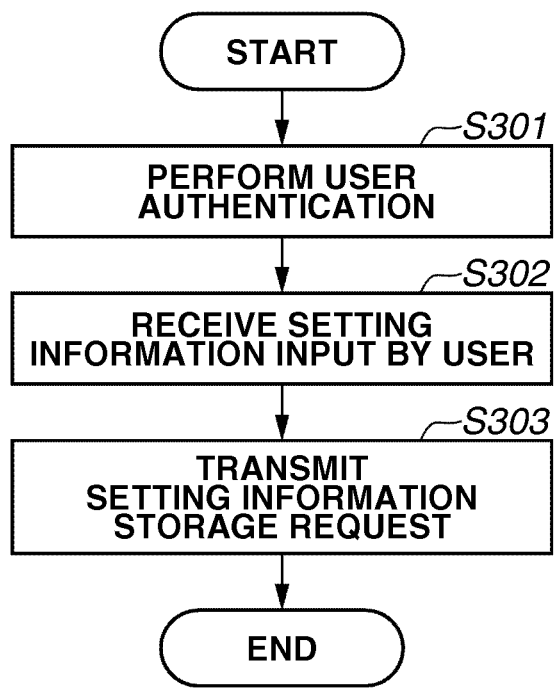
FIG. 7 is a flowchart illustrating an example procedure of setting information setting processing that can be performed by the image processing server according to the first embodiment of the present invention.

FIG. 7 is a flowchart illustrating an example procedure of processing that can be performed by the image processing server 20 to set operational conditions, as setting information, to control the digital multifunction peripheral 10 or the image processing server 20.

In step S301, the main control unit 2000 performs user authentication via the UI control unit 2001. The user authentication to be performed in step S301 is similar to that described in step S101 and therefore the description thereof is not repeated.

In step S302, the main control unit 2000 causes the UI control unit 2001 to display a setting screen on the display device 108 of the image processing server 20 to receive user setting information via the keyboard 107 of the image processing server 20. The setting control unit 2002 receives the input setting information via the main control unit 2000 and stores the setting information in the RAM 101 of the image processing server 20. In this case, the setting item relating to the page filtering, which has been input as part of the setting information, is described in detail below with reference to the example illustrated in FIG. 14.

In step S303, the setting control unit 2002 transmits, via the main control unit 2000, the setting information storage request to the setting control unit 3001 of the data server 30. In this case, the setting information storage request transmitted in step S303 includes the setting information having been input in step S302. Although not illustrated in the drawings, the setting control unit 3001 of the data server 30 extracts the setting information included in the setting storage request transmitted from the image processing server 20, via the file operation unit 3003, and stores the setting information in the HDD 109 of the data server 30.

Figure 8:
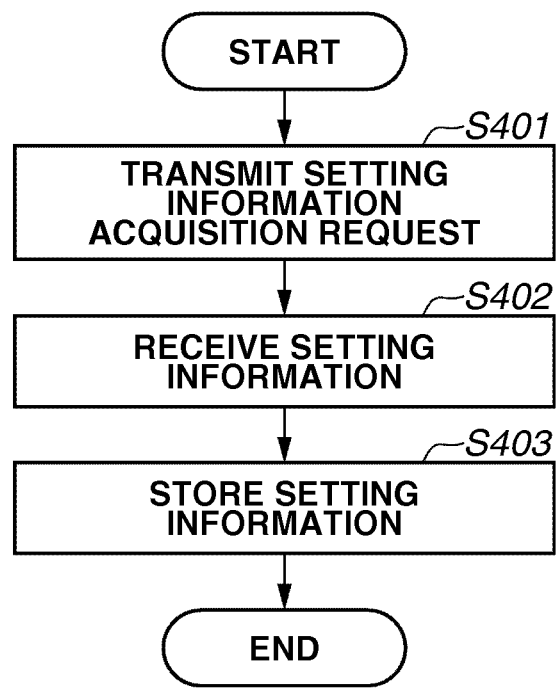
FIG. 8 is a flowchart illustrating an example procedure of setting information acquisition request processing that can be performed by the digital multifunction peripheral according to the first embodiment of the present invention.

FIG. 8 is a flowchart illustrating an example procedure of setting information acquisition request processing that can be performed by the digital multifunction peripheral 10. In the present embodiment, in FIG. 7, it is presumed that the setting of the digital multifunction peripheral 10 has been performed via the UI control unit 2001 of the image processing server 20. The processing illustrated in FIG. 8 represents a mechanism of acquiring the latest setting information at predetermined timing.

In the present embodiment, the digital multifunction peripheral 10 generates the setting information acquisition request at timing determined beforehand or according to a designated schedule. Alternatively, the digital multifunction peripheral 10 can generate the setting information acquisition request in response to a user operation entered via the UI control unit 1001.

In step S401, the main control unit 1000 of the digital multifunction peripheral 10 transmits a setting information acquisition request to the main control unit 2000 of the image processing server 20. In step S402, the main control unit 1000 receives setting information from the main control unit 2000 of the image processing server 20. The main control unit 1000 sends the received setting information to the setting control unit 1002. The setting control unit 1002 stores the setting information in the RAM 201. In step S403, the setting control unit 1002 stores the setting information in the HDD 203 via the file operation unit 1005.

Figure 9:
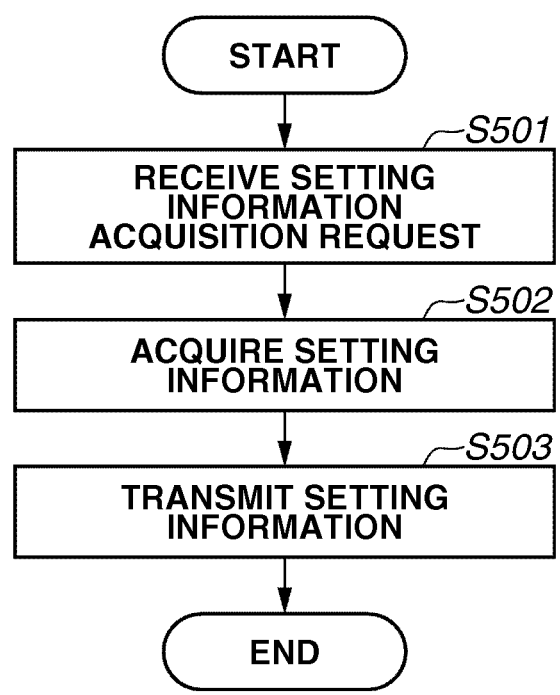
FIG. 9 is a flowchart illustrating an example procedure of processing that can be performed by the image processing server to receive a setting information acquisition request from the digital multifunction peripheral according to the first embodiment of the present invention.

FIG. 9 is a flowchart illustrating an example procedure of processing that can be performed by the image processing server 20 to receive the setting information acquisition request from the digital multifunction peripheral 10.

In step S501, the main control unit 2000 of the image processing server 20 receives the setting information acquisition request from the main control unit 1000 of the digital multifunction peripheral 10. In step S502, the main control unit 2000 acquires the setting information via the setting control unit 3001 and the file operation unit 3003 of the data server 30. In step S503, the main control unit 2000 transmits the setting information to the main control unit 1000 of the digital multifunction peripheral 10.

Figure 10:
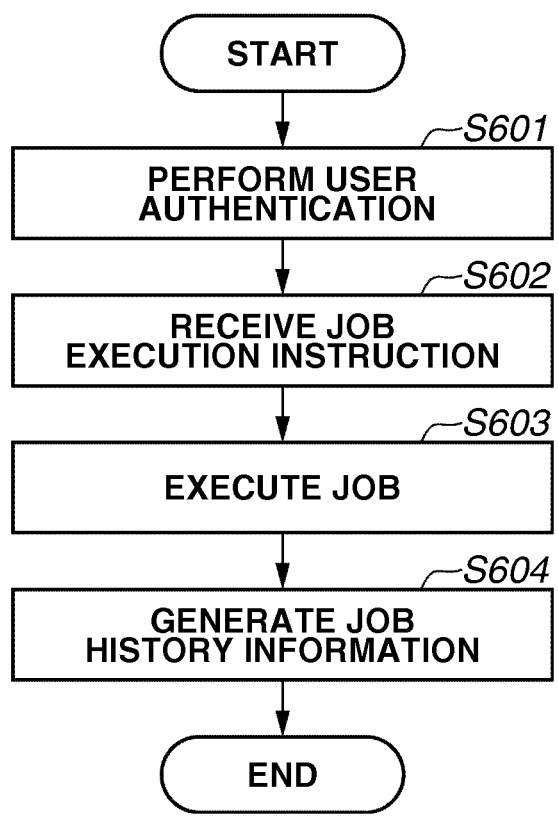
FIG. 10 is a flowchart illustrating an example procedure of job execution and job history information generation processing that can be performed by the digital multifunction peripheral according to the first embodiment of the present invention.

FIG. 10 is a flowchart illustrating an example procedure of job execution and job history information generation processing that can be performed by the digital multifunction peripheral 10. In step S601, the main control unit 1000 performs user authentication via the UI control unit 1001. The user authentication to be performed in step S601 is similar to that described in step S101 and therefore the description thereof is not repeated.

In step S602, the main control unit 1000 receives a job execution instruction from a user via the UI control unit 1001 or a job execution instruction from an external system (e.g., a driver). In step S603, the main control unit 1000 instructs a job execution to the job control unit 1003. The job control unit 1003 executes the job. In the context of the present disclosure, the terminology "job" includes at least one of copy, print, SEND, FAX transmission/reception, and electronic mail sending operations.

In step S604, the main control unit 1000 instructs the job history information control unit 1004 to generate job history information. The job history information control unit 1004 generates job history information relating to an executed job and stores the generated job history information in the HDD 203. The job history information includes at least one log attribute and image data having been input during the execution of the job.

Figure 11:
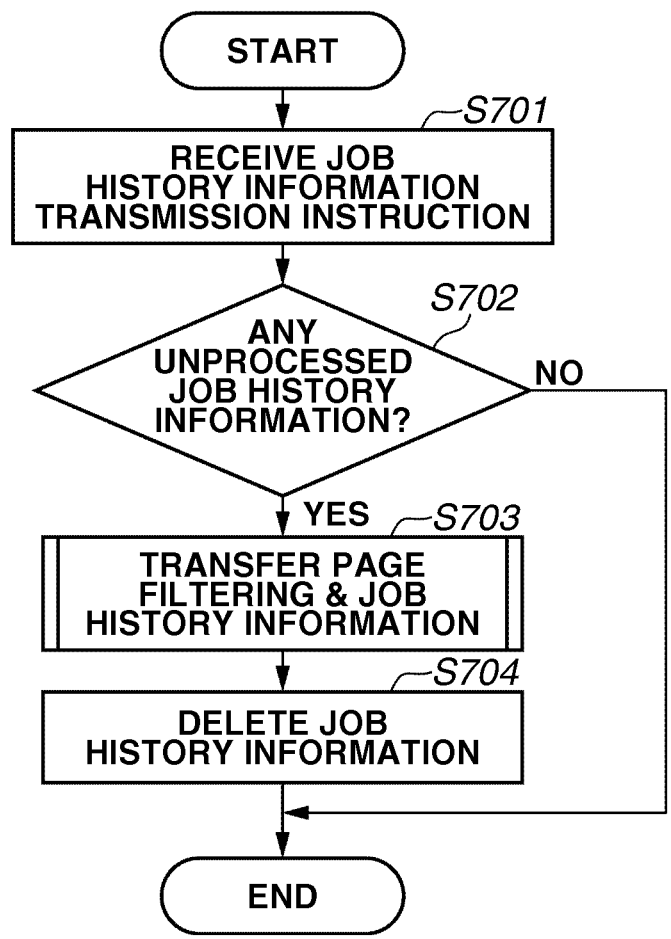
FIG. 11 is a flowchart illustrating an example procedure of processing that can be performed by the digital multifunction peripheral to transmit job history information to the image processing server.

FIG. 11 is a flowchart illustrating an example procedure of processing that can be performed by the digital multifunction peripheral 10 to transmit the job history information to the image processing server 20. In the present embodiment, users can instruct the transmission timing via the UI control unit 1001 of the digital multifunction peripheral 10.

The digital multifunction peripheral 10 can perform the transmission of the job history information at timing determined beforehand or according to a designated schedule. Further, a remote PC can access the digital multifunction peripheral 10 to instruct transmission of the job history information. Further, the UI control unit 2001 of the image processing server 20 can instruct the transmission of the job history information.

In step S701, the main control unit 1000 receives a job history information transmission instruction from the UI control unit 1001. In step S702, the main control unit 1000 determines whether the job history information generated in step S604 includes any unprocessed information.

If it is determined that there is unprocessed information (YES in step S702), the processing proceeds to step S703. On the other hand, if it is determined that there is not any unprocessed information (NO in step S702), the main control unit 1000 terminates the processing of the flowchart illustrated in FIG. 11.

In step S703, the job history information control unit 1004 performs page filtering processing and transmits the job history information to the image processing server 20. The processing to be performed in step S703 is described in detail below with reference to a flowchart illustrated in FIG. 13. The operational conditions for the page filtering processing can be determined, via the main control unit 1000, by referring to the setting information stored in the RAM 201 obtained from the setting control unit 1002.

In step S704, the job history information control unit 1004 deletes the job history information of the job having been successfully transmitted to the image processing server 20.

Figure 12:
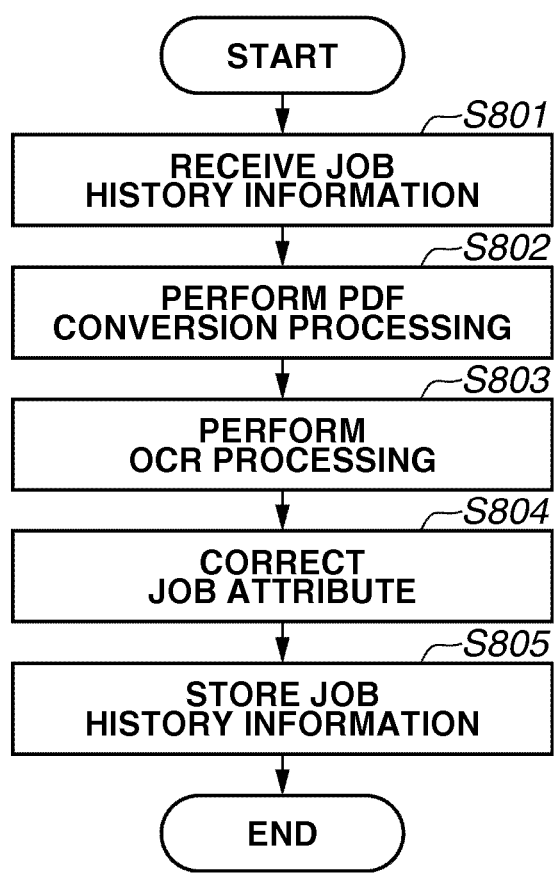
FIG. 12 is a flowchart illustrating an example procedure of processing that can be performed by the image processing server to receive job history information from the digital multifunction peripheral and store the received job history information in a data server.

FIG. 12 is a flowchart illustrating an example procedure of processing that can be performed by the image processing server 20 to receive job history information from the digital multifunction peripheral 10 and store the received job history information in the data server 30.

In step S801, the main control unit 2000 receives job history information from the main control unit 1000 of the digital multifunction peripheral 10.

In step S802, the image processing unit 2003 performs image conversion processing based on the job history information received via the main control unit 2000. Then, the image processing unit 2003 generates Portable Document Format (PDF) data to display a search result.

The file format "PDF" is only an example of the general file format employable in the present embodiment. For example, another file format (e.g., JPEG, TIFF, etc.) is employable. Further, in the image conversion processing, the image processing unit 2003 can convert the resolution to a low resolution level and convert the number of colors to a gray scale image or a binary image.

In step S803, the image processing unit 2003 performs OCR processing based on the job history information received via the main control unit 2000 and extracts text information for a text search. The image data to be subjected to the OCR processing can be image data having been subjected to the resolution conversion and binary image conversion processing beforehand.

In step S804, the main control unit 2000 corrects a log attribute of the job history information. In the present embodiment, it is presumed that the main control unit 2000 adds information obtained from the setting control unit 2002 and obtains a final version of the log attribute to be stored in the data server 30.

In step S805, the main control unit 2000 transmits job history information including at least one of a PDF file, the text information, and the log attribute to the job history information control unit 1004 of the data server 30.

Although not illustrated in the drawings, if the job history information control unit 3000 of the data server 30 receives job history information, the job history information control unit 3000 stores the job history information in the HDD 109 of the data server 30 via the file operation unit 3003. In this case, the job history information control unit 3000 stores the job history information in association with the PDF file, the text information, and the log attribute.

Although not described in detail in the present embodiment, to realize a search of a similar image, it is useful to provide processing for extracting image feature quantity for an image search.

Figure 13:
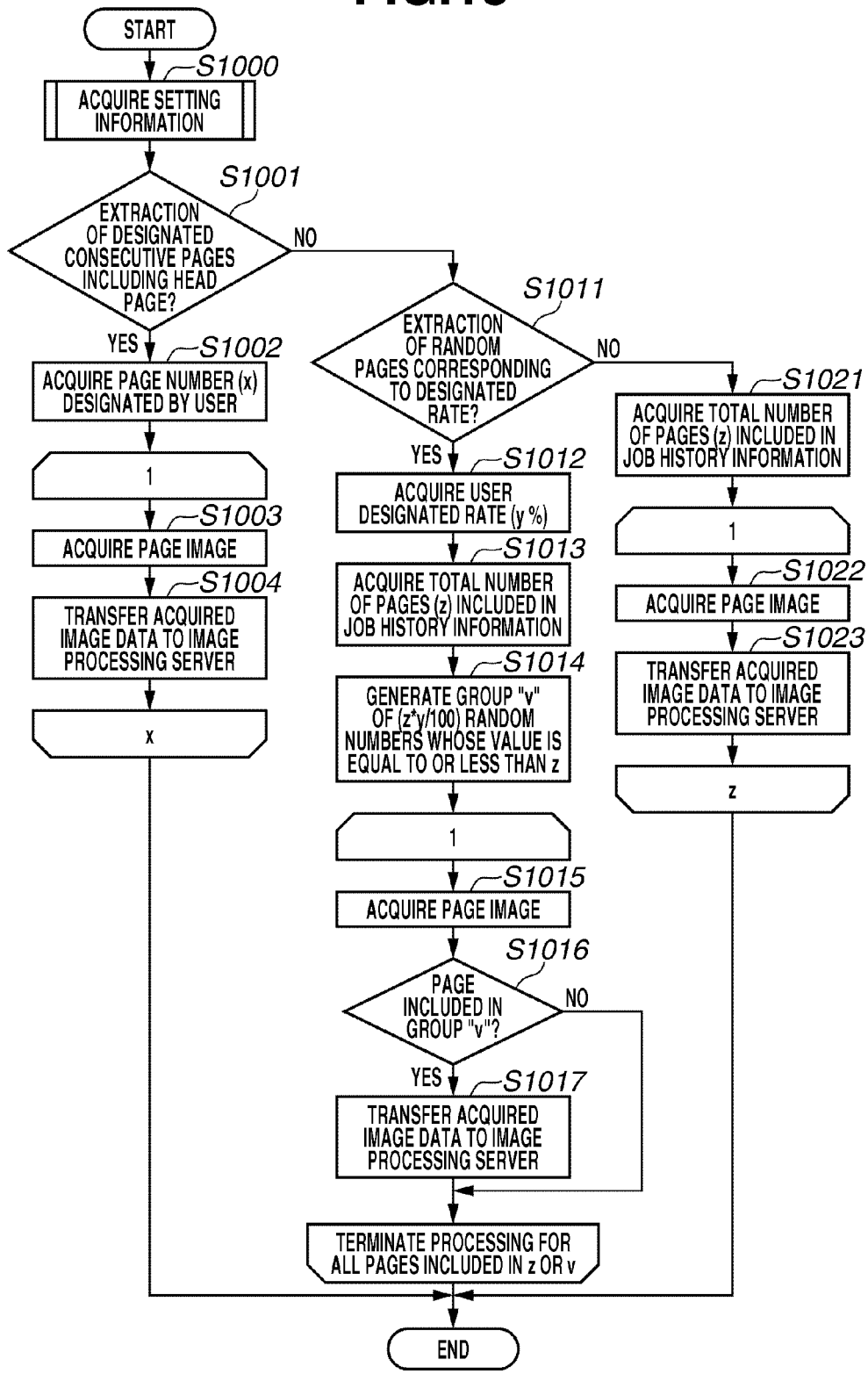
FIG. 13 is a flowchart illustrating an example procedure of page filtering and job history information transfer processing that can be performed by the digital multifunction peripheral according to the first embodiment of the present invention.

FIG. 13 is a flowchart illustrating a detailed procedure of the page filtering and job history information transfer processing to be performed in step S703 of the flowchart illustrated in FIG. 11.

In step S1000, the job history information control unit 1004 acquires operational conditions of the page filtering processing, via the main control unit 1000, from the setting information stored in the RAM 201 by the setting control unit 1002. More specifically, the operational conditions of the page filtering processing include at least one of the following items:

"All" (image data of all pages is stored)

"Designated consecutive pages including the head page" (image data of sequential pages ranging from the first page to a designated page is stored)

"Random pages corresponding to the designated rate" (image data of a predetermined number of pages corresponding to a designated rate of the total number of pages is randomly stored)

In the present embodiment, users can perform setting beforehand. Further, any other setting stored in the system is usable in the operation.

In step S1001, the job history information control unit 1004 confirms the setting information and determines whether the option "designated consecutive pages including the head page" is set as an upper limit of the filtering operation. If it is determined that the option "designated consecutive pages including the head page" is designated (YES in step S1001), the processing proceeds to step S1002. On the other hand, if it is determined that the option "designated consecutive pages including the head page" is not designated (NO in step S1001), the processing proceeds to step S1011.

In step S1002, the job history information control unit 1004 confirms the setting information and acquires a user designated page number "x." Subsequently, the job history information control unit 1004 repetitively performs the sequential processing of step S1003 and step S1004 for each of the head (i.e., the first) page to the designated page "x."

In step S1003, the job history information control unit 1004 acquires image data from the HDD 203 via the file operation unit 1005. In step S1004, the job history information control unit 1004 transmits the image data acquired in step S1003 to the image processing server 20. When the above-described processing is completed, the image data of the first page to the designated x-th page can be acquired and transmitted to the image processing server 20.

In step S1011, the job history information control unit 1004 confirms the setting information and determines whether the option "random pages corresponding to the designated rate" is set. If it is determined that the option "random pages corresponding to the designated rate" is set (YES in step S1011), the processing proceeds to step S1012. On the other hand, if it is determined that the option "random pages corresponding to the designated rate" is not set (NO in step S1011), the processing proceeds to step S1021.

In step S1012, the job history information control unit 1004 confirms the setting information and acquires a user designated rate "y" (percentage). In step S1013, the job history information control unit 1004 acquires, via the file operation unit 1005, the total number of pages "z" included in the job history information stored in the HDD 203.

In step S1014, the job history information control unit 1004 generates a group "v" of (z*y/100) random numbers whose values are equal to or less than "z", which corresponds to the designated rate of the total number of pages. In the present embodiment, if the value of (z*y/100) is not an integer (i.e., a whole value), the job history information control unit 1004 obtains a rounded-up integer value, or can obtain a rounded-down integer value or a "rounded-off" integer value.

Further, in the random number generation processing, the job history information control unit 1004 can use any algorithm if it is feasible to generate (z*y/100) numerical values that do not have any regularity. For example, the job history information control unit 1004 can generate the (z*y/100) random numbers according to a conventionally known random number generation algorithm. If the job history information control unit 1004 generates a total of 100 random numbers according to the random number generation algorithm, the job history information control unit 1004 can count up a numerical value in the third digit (i.e., the hundred's place) of an already generated random number to obtain additional values.

Subsequently, the job history information control unit 1004 repetitively performs the sequential processing of step S1015 to step S1017 for each of the head (i.e., the first) page to the final page "z", or until all of the pages corresponding to the random number group "v" are processed.

In step S1015, the job history information control unit 1004 acquires image data from the HDD 203 via the file operation unit 1005. In step S1016, the job history information control unit 1004 confirms whether the page acquired in step S1015 is a page corresponding to one of the random number group "v."

If it is determined that the acquired page is a page corresponding to one of the random number group "v" (YES in step S1016), then in step S1017, the job history information control unit 1004 transmits the image data acquired in step S1015 to the image processing server 20. When the above-described processing is completed, the image data of the pages corresponding to the rate designated by the setting information, i.e., a part of the image data of all pages included in the job, can be randomly acquired and transmitted to the image processing server 20.

In step S1021, the job history information control unit 1004 acquires, via the file operation unit 1005, the total number of pages "z" included in the job history information stored in the HDD 203. Subsequently, the job history information control unit 1004 repetitively performs the sequential processing of step S1022 and step S1023 for each of the head (i.e., the first) page to the final page "z."

In step S1022, the job history information control unit 1004 acquires image data from the HDD 203 via the file operation unit 1005. In step S1023, the job history information control unit 1004 transmits the image data acquired in step S1022 to the image processing server 20. When the above-described processing is completed, the image data of all pages included in the job can be acquired and transmitted to the image processing server 20.

FIG. 14 illustrates an example of the user interface that enables users to set page filtering conditions when the setting information input reception processing illustrated in FIG. 5 or FIG. 7 is performed. The user interface illustrated in FIG. 14 includes the following three radio buttons, which represent operational conditions of the page filtering processing.

"All"

If the setting option "all" is designated, the digital multifunction peripheral 10 does not perform any page filtering processing and stores image data of all pages. This setting is appropriate for the users who want to secure satisfactory security in a situation where the secured HDD capacity is sufficiently large.

"Designated Consecutive Pages Including the Head Page"

If the setting option "designated consecutive pages including the head page" is designated, the image data of the sequential pages ranging from the first page to the designated page can be stored. This setting is appropriate for the users who want to reduce the HDD capacity and secure satisfactory security.

In particular, it is useful to designate the setting option "designated consecutive pages including the head page" in a case where satisfactory security can be secured by storing only a certain amount of image data including the head page. If the radio button indicating the "designated consecutive pages including the head page" is selected, a page number designation edit box becomes active to enable a user to input a desired page range including the head page.

"Random Pages Corresponding to the Designated Rate"

If the setting option "random pages corresponding to the designated rate" is designated, the image data of a number of pages corresponding to a designated rate of the total number of pages included in the job can be randomly stored. The setting option "random pages corresponding to the designated rate" is appropriate for the users who want to reduce the HDD capacity and secure satisfactory security.

In particular, it is useful to designate the setting option "random pages corresponding to the designated rate" in a case where storing image data sampled from the whole pages (not fixed pages) is desired. If the radio button indicating the "random pages corresponding to the designated rate" is selected, a rate designation edit box becomes active to enable a user to input a desired rate (i.e., a percent of to-be-stored pages of the total number of pages). In the present embodiment, a drop-down list is available to select a desirable value. However, it is also useful to enable each user to input an arbitrarily numerical value.

Further, although not illustrated in the drawings, the setting information includes the following operational conditions of the system that may be input by users.

Job history information storage setting (e.g., storage of log attribute information only, storage of log attribute information and image data, etc.)

Job history information transmission setting (e.g., transmission destination image processing server setting including transmission schedule and URL)

Image processing setting (e.g., resolution conversion, storage file format (e.g., one document per page or one document per file), reduction in the number of colors, etc.)

Mail notification setting (e.g., mail address (notification destination) designation, error notification, storage notification, etc.)

Further, in the present embodiment, the apparatus that performs the page filtering processing is not limited to the digital multifunction peripheral 10. For example, the image processing server 20 can execute the page filtering processing according to the present embodiment.

In this case, the page filtering and job history information transfer processing to be performed by the digital multifunction peripheral 10 in association with the image processing server 20 is limited to only the processing for extracting and transmitting all pages (see step S1021 to step S1023 illustrated in FIG. 13). The extraction processing accompanied by the page filtering processing (see step S1001 to step S1017) can be performed between step S801 and step S802 illustrated in FIG. 12.

A second embodiment that can realize the present invention is described below with reference to the attached drawings. A job history information auditing system according to the present embodiment is similar to the system described in the first embodiment. Therefore, only the portions different from those described in the first embodiment are described in the second embodiment.

In the first embodiment, in step S1001 and step S1011 illustrated in FIG. 13, the job history information control unit 1004 determines whether one of the options "all", "designated consecutive pages including the head page", and "random pages corresponding to the designated rate" is designated. In the second embodiment, designating a combination of the above-described options is feasible.

Further, in the second embodiment, additional options "designated page(s)" and "storage probability for each page" are settable as setting information (i.e., operational conditions) in addition to the above-described three options "all", "designated consecutive pages including the head page", and "random pages corresponding to the designated rate."

FIG. 15 is a flowchart illustrating a detailed procedure of the page filtering and job history information transfer processing to be performed in step S703 illustrated in FIG. 11 according to the second embodiment.

In step S1100, the job history information control unit 1004 acquires, via the main control unit 1000, operational conditions of the page filtering processing from the setting information stored in the RAM 201 by the setting control unit 1002. More specifically, the operational conditions of the page filtering processing include at least one of the following items.

"All" (image data of all pages is stored)

"Designated consecutive pages including the head page" (image data of sequential pages ranging from the first page to a designated page is stored)

"Designated page(s)" (image data of each designated page is stored)

"Random pages corresponding to the designated rate" (image data of a number of pages corresponding to a designated rate of the total number of pages is randomly stored)

"Storage probability for each page" (determination of image data to be stored at a designated probability for each page).

For example, if the user designated probability is 50%, it is determined whether to store each page at a probability of ½. In this case, the number of stored pages may be zero, or to the contrary, all pages may be stored.

In step S1101, the job history information control unit 1004 confirms the setting information and determines whether to perform page filtering. If the option "all" is designated among the above-described operational conditions, the job history information control unit 1004 determines that the page filtering is not performed.

If it is determined that the page filtering is not performed, the processing proceeds to the flow of step S1131 to S1133 (i.e., the processing to be performed when the option "all" is designated). The processing to be performed in steps S1131 to S1133 is similar to that described in steps S1021 to S1023 illustrated in FIG. 13 and therefore the description thereof is not repeated. On the other hand, if it is determined to perform the page filtering (YES in step S1101), the processing proceeds to step S1110.

In step S1110, the job history information control unit 1004 confirms the setting information and determines whether the option "storage probability for each page" is designated. If it is determined that the "storage probability for each page" is designated (YES in step S1110), the processing proceeds to step S1102. If it is determined that the option "storage probability for each page" is not designated (NO in step S1110), the processing proceeds to step S1111.

In step S1102, the job history information control unit 1004 confirms the setting information and acquires a user designated probability. In step S1103, the job history information control unit 1004 acquires the total number of pages "z" of the job history information stored in the HDD 203, via the file operation unit 1005. Subsequently, the job history information control unit 1004 repetitively performs the sequential processing of step S1104 to step S1106 for each of the head (the first) page to the final page "z."

In step S1104, the job history information control unit 1004 acquires image data from the HDD 203 via the file operation unit 1005. In step S1105, the job history information control unit 1004 determines whether to store the acquired page based on the designated probability.

If it is determined to store the acquired page based on the designated probability (YES in step S1105), then in step S1106, the job history information control unit 1004 transmits the image data acquired in step S1105 to the image processing server 20.

As an example determination method in a case where the user designated probability is 50%, the job history information control unit 1004 generates random numbers and stores the acquired page, if the random numbers are dividable by two. Any other method can be employed.

If it is not determined to store the acquired page based on the designated probability (NO in step S1105), the job history information control unit 1004 starts the processing for the next page without storing the image data of the acquired page.

In step S1111, the job history information control unit 1004 confirms the setting information and determines whether the option "designated consecutive pages including the head page" is designated. If it is determined that the option "designated consecutive pages including the head page" is designated (YES in step S1111), the processing proceeds to step S1112. If it is determined that the option "designated consecutive pages including the head page" is not designated (NO in step S1111), the processing proceeds to step S1114.

In step S1112, the job history information control unit 1004 confirms the setting information and acquires user designated page numbers. In step S1113, the job history information control unit 1004 adds the designated consecutive pages including the first page into a group "p" of the pages to be stored.

In step S1114, the job history information control unit 1004 confirms the setting information and determines whether the option "designated page(s)" is designated. If it is determined that the option "designated page(s)" is designated (YES in step S1114), the processing proceeds to step S1115. If it is determined that the option "designated page (s)" is not designated (NO in step S1114), the processing proceeds to step S1117.

In step S1115, the job history information control unit 1004 confirms the setting information and acquires user designated page number(s). In step S1116, the job history information control unit 1004 adds the acquired user designated page (s) into the group "p" of the pages to be stored. However, if the page number is the one having been already added in step S1113, the job history information control unit 1004 does not add the duplicate page number in step S1116.

In step S1117, the job history information control unit 1004 confirms the setting information and determines whether the option "random pages corresponding to the designated rate" is designated. If it is determined that the option "random pages corresponding to the designated rate" is designated (YES in step S1117), the processing proceeds to step S1118. If it is determined that the option "random pages corresponding to the designated rate" is not designated (NO in step S1117), the processing proceeds to step S1122.

In step S1118, the job history information control unit 1004 confirms the setting information and acquires a user designated rate "y" (percentage). In step S1119, the job history information control unit 1004 acquires, via the file operation unit 1005, the total number of pages "z" included in the job history information stored in the HDD 203.

In step S1120, the job history information control unit 1004 generates a group "v" of ((z−p) *y/100) random numbers whose values are equal to or less than "z", which corresponds to the designated rate of the total number of pages but the pages not yet included in the group "p."

The random number generation to be performed in step S1120 is similar to that described in step S1014 illustrated in FIG. 13 and is therefore the description thereof is not repeated. In step S1121, the job history information control unit 1004 adds the random number group "v" generated in step S1120 to the group "p" of the pages to be stored.

Subsequently, the job history information control unit 1004 repetitively performs the sequential processing of step S1122 to step S1124 for each of the head (the first) page to the last page, or until the processing of the pages corresponding to the group "p" is thoroughly completed.

In step S1122, the job history information control unit 1004 acquires image data from the HDD 203 via the file operation unit 1005. In step S1123, the job history information control unit 1004 confirms whether the page acquired in step S1122 is a page corresponding to one of the group "p."

If it is determined that the acquired page is a page corresponding to one of the group "p" (YES in step S1123), then in step S1124, the job history information control unit 1004 transmits the image data acquired in step S1122 to the image processing server 20.

In the above-described embodiment, the option "storage probability for each page" is not designated together with another item. However, it is feasible to set the option "storage probability for each page" together with any other item. In this case, as an example, there is a method for determining whether to store a page, if not determined to store after the page filtering processing is performed according to another setting, at a designated probability.

More specifically, if the determination result is NO in step S1123 illustrated in FIG. 15, the job history information control unit 1004 can determine whether to store the page based on the probability designated in step S1105 and then transmit the page data to the image processing server 20.

Further, as another example, there is a method for determining whether to store a page, if it is determined to store the page after the page filtering processing is performed according to another setting, at a designated probability. More specifically, if the determination result is YES in step S1123 illustrated in FIG. 15, the job history information control unit 1004 can execute the processing of step S1124 only for the page determined to be stored based on the probability designated in step S1105 and then transmit the page data to the image processing server 20.

FIG. 16 illustrates an example of the user interface that enables users to set operational conditions of the page filtering processing when the setting information input reception processing illustrated in FIG. 5 or FIG. 7 is performed according to the second embodiment.

The user interface illustrated in FIG. 16 includes the following two radio buttons selectable by users.

"All" (the description thereof is not repeated because it is similar to the radio button "all" illustrated in FIG. 14)

"Perform page filtering processing"

If the setting option "perform page filtering processing" is designated, the page filtering processing can be performed and image data of a limited number of pages can be stored. The setting option "perform page filtering processing" is appropriate for the users who want to reduce the HDD capacity and secure satisfactory security.

When the radio button indicating the "perform page filtering processing" is selected, the following four check boxes become selectable to enable users to further designate a desired page filtering processing method.

"Designated Consecutive Pages Including the Head Page"

If the setting option "designated consecutive pages including the head page" is designated, the image data of the sequential pages ranging from the first page to the designated page can be stored. When the radio button indicating the "designated consecutive pages including the head page" is selected, the page number designation edit box becomes active to enable a user to input a desired page range including the head page.

"Designated Page (s)"

If the setting option "designated page (s)" is designated, the image data of the designated page number can be stored. When the radio button indicating the "designated page (s)" is selected, the page number designation edit box becomes active to enable a user to input a desired page number. Using the comma (,) is useful to input a plurality of page numbers. Further, the hyphen (-) is usable to input consecutive page numbers.

"Random Pages Corresponding to the Designated Rate"

If the setting option "random pages corresponding to the designated rate" is selected, the image data of a predetermined number of pages corresponding to a designated rate of the total number of pages included in the job can be randomly stored.

If the radio button indicating "random pages corresponding to the designated rate" is selected, the rate designation edit box becomes active to enable a user to input a desired rate (i.e., a percent of to-be-stored pages of the total number of pages). In the present embodiment, the drop-down list is available to select a desirable value. However, it is also useful to enable each user to input an arbitrary numerical value.

"Storage Probability for Each Page"

If the setting option "storage probability for each page" is designated, it is determined whether to store image data at a designated probability for each page and the image data of random pages can be stored. In the present embodiment, it is presumed that the setting option "storage probability for each page" is an exclusive item. Therefore, if a user tries to complete the setting in a state where the box of any other option is checked, an error message is displayed to inform a user of the necessity of restarting setting processing. However, if it is desired, the setting option "storage probability for each page" can be a non-exclusive item.

A third embodiment that can realize the present invention is described below with reference to the attached drawings. A job history information auditing system according to the present embodiment is similar to the system described in the first embodiment. Therefore, only the portions different from those described in the first embodiment are described in the third embodiment.

In the first embodiment, the setting information is stored for each digital multifunction peripheral so that each digital multifunction peripheral can operate according to the designated setting information all the time. The third embodiment is different from the first embodiment in that the setting information can be stored for each group (or each user) having executed the job. Further, the page filtering operation is changeable depending on each time period.

For example, it is feasible to constitute the following flexible job history information auditing system.

All pages of all jobs can be stored during non-working hours and the page filtering is performed during working hours to store a limited number of pages.

All pages of a job can be stored if the job is executed by a user of a group that constantly handles confidential information.

All pages of a job can be stored for a department that seldom handles confidential information if the job is executed during night-time.

In the present embodiment, it is presumed that the user information and the setting information are stored in the data server 30. However, each of the above-described information can be stored in any one of the digital multifunction peripheral 10, the image processing server 20, and an external authentication server. Further, in the present embodiment, it is presumed that the setting is determined for each group. However, the setting can be determined for each user.

FIG. 17 illustrates an example of the user interface that enables users to set operational conditions of the page filtering processing for each group when the setting information input reception processing illustrated in FIG. 5 or FIG. 7 is performed according to the present embodiment.

If a "DESIGNATION OF USER" button is pressed and a user is designated, a screen can be displayed to designate a user belonging to a group 1. Although not illustrated in the drawings, a user name can be input or can be selected from a user list on the displayed screen when the "DESIGNATION OF USER" button is pressed. Performing the setting for each user belonging to the group becomes feasible.

The user interface illustrated in FIG. 17 enables each user to set the same page filtering conditions or different page filtering conditions, for each day for each time period in the field of "storage designation for days of the week and time period."

Further, the user interface illustrated in FIG. 17 enables each user to set detailed page filtering conditions in the rectangular frame positioned at the lower part of the screen. If the "full time" is designated for a specific day, a "page range to be stored" setting becomes effective for the day.

If the "designated time period" is designated for a specific day, each "page range to be stored" setting becomes effective for the day. The page filtering can be designated for each input time period. The processing can be performed according to the page filtering setting of the time period that is correspondent in job execution date and time.

If a "page range to be stored" button is pressed by a user, the screen illustrated in FIG. 14 or FIG. 16 can be displayed to enable the user to set operational conditions of the page filtering processing for a corresponding time period.

FIG. 18 illustrates an example user list stored in the data server 30 according to the present embodiment. The user list illustrated in FIG. 18 can be used to manage a plurality of types of user information (e.g., user name, user group, department name, and mail address) in association with each other.

For example, a user "A" belongs to the group 1. Therefore, if a job is executed by the user "A", job history information subjected to the page filtering according to the setting of the group 1 illustrated in FIG. 19 or FIG. 20 is stored.

FIG. 19 illustrates a setting example for the "days of the week and time period", which is stored in the data server 30, according to the present embodiment. In the setting of the group 1, to secure satisfactory security, all of the job history information can be surely stored during the holidays as well as the non-working hours of the weekdays (i.e., from Monday to Friday). On the other hand, during the working hours of each weekday, it is believed that malicious information leakage can be effectively prevented due to the presence of somebody (e.g., a supervisor or a colleague). This is the reason why the page filtering can be set during the working hours of each weekday.

More specifically, the setting for weekdays includes the page filtering setting to be performed independently for each of night-time (21:00 to 8:30), morning working hours (8:30 to 12:00), lunch break (12:00 to 13:00), and afternoon working hours (13:00 to 21:00). On the other hand, the setting for holidays does not include any page filtering.

FIG. 20 illustrates an example of the page filtering setting for each time period stored in the data server 30 according to the present embodiment. The time period setting for the group 1 illustrated in FIG. 19 includes the setting of the page filtering to be performed independently for each of "full time" (corresponding to the weekend), "time period 1" (corresponding to the night-time), "time period 2" (corresponding to the morning working hours), "time period 3" (corresponding to the lunch break), and "time period 4" (corresponding to the afternoon working hours). An example of the page filtering setting information corresponding to each time period is described.

It is desired to store job history information of all pages during the weekend (corresponding to the "full time") and the night-time (corresponding to the "time period 1"). Therefore, it is useful to designate the setting for storing all pages. For example, it is desired to select the option "all" on the user interface illustrated in FIG. 16.

Further, it is desired to store appropriately sampled job history information during the morning working hours (corresponding to the "time period 2") and the afternoon working hours (corresponding to the "time period 4"). Therefore, it is useful to store 10% of the whole pages. For example, it is desired to designate "10%" when the option "random pages corresponding to the designated rate" is selected on the user interface illustrated in FIG. 16, Further, it is desired to secure a little higher security level during the lunch break (corresponding to the time period 3) compared to the working hours. For example, it is useful to store the first to the tenth pages, the 20th page, the 30th page, the 40th page, and 50th page, and further store 10% of the remaining pages.

For example, it is desired to designate the following contents on the user interface illustrated in FIG. 16.
    Selecting the option "designated consecutive pages including the head page" and designating the "10th" page
    Selecting the option "designated page (s)" and designating the "20th, 30th, 40th, and 50th" pages
    Selecting the option "random pages corresponding to the designated rate" and designating "10%"

Figure 21:
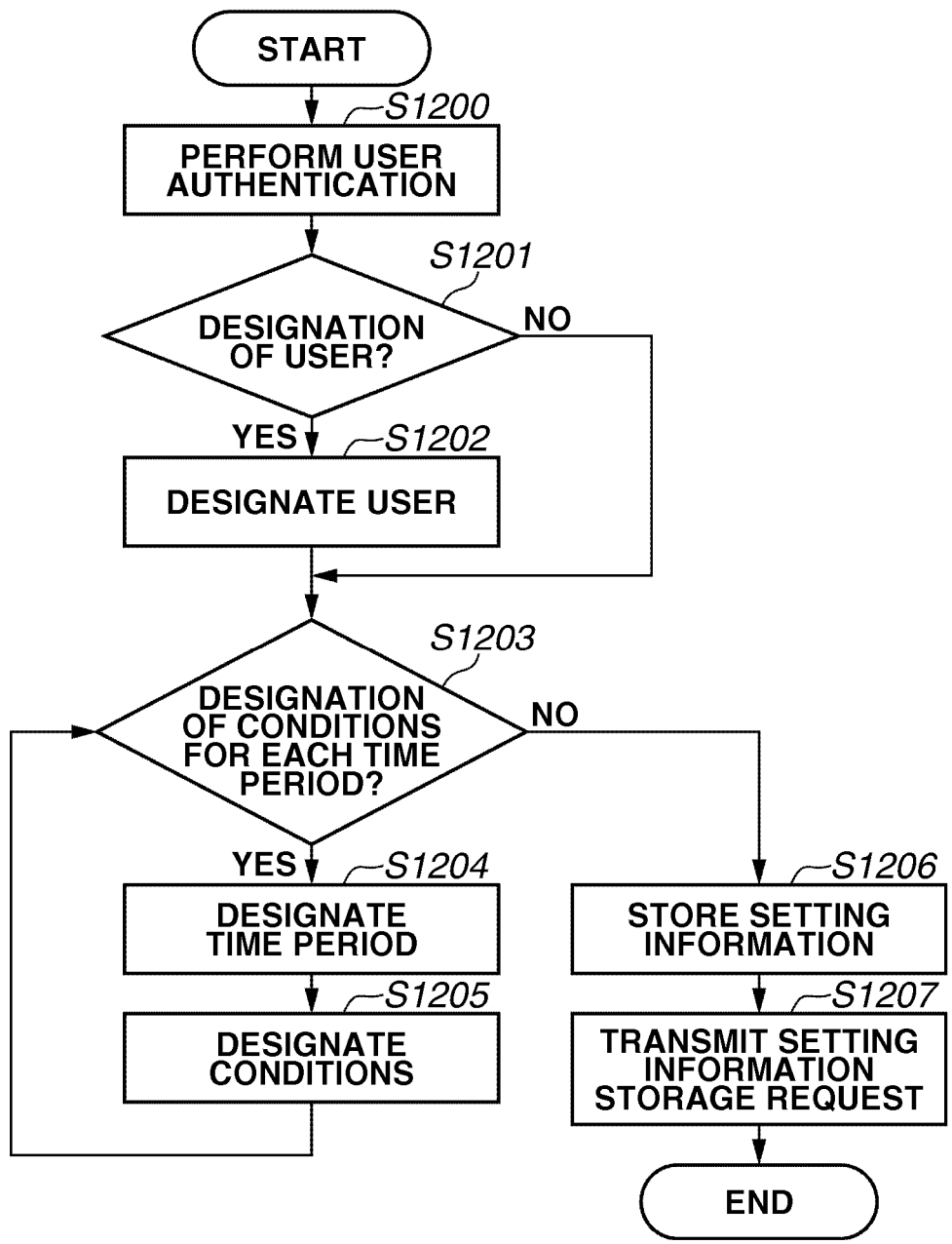
FIG. 21 is a flowchart illustrating an example procedure of processing for setting operational conditions of the page filtering processing according to the third embodiment of the present invention.

FIG. 21 is a flowchart illustrating an example procedure of processing for setting operational conditions of the page filtering processing according to the present embodiment, which is similar to the flowchart illustrated in FIG. 5 or FIG. 7. Similar to the flowchart illustrated in FIG. 5, the processing of the flowchart illustrated in FIG. 21 can be performed by the digital multifunction peripheral 10.

Alternatively, similar to the flowchart illustrated in FIG. 7, the processing of the flowchart illustrated in FIG. 21 can be performed by the image processing server 20.

Hereinafter, an example setting for changing operational conditions to be applied, when the page filtering is performed, based on a job executing user and job execution date and time information is described.

In step S1200, the main control unit 1000 performs user authentication via the UI control unit 1001. The user authentication to be performed in step S1200 is similar to that described in step S101 illustrated in FIG. 5 and therefore the description thereof is not repeated.

In step S1201, the main control unit 1000 causes the UI control unit 1001 to confirm whether to perform user designation for a group for which the setting is performed. If it is determined to perform the user designation (YES in step S1201), then in step S1202, the main control unit 1000 performs the user designation.

More specifically, in step S1202, the main control unit 1000 causes the UI control unit 1001 to instruct a user to designate a user name to be associated with the group. The user designates a user name via the UI control unit 1001.

In step S1203, the main control unit 1000 causes the UI control unit 1001 to confirm whether to designate conditions for each time period. If it is determined to designate the conditions for each time period (YES in step S1203), the processing proceeds to step S1204.

In step S1204, the main control unit 1000 causes the UI control unit 1001 to instruct the user to designate a time period. The user designates a time period via the UI control unit 1001. In step S1205, the main control unit 1000 designates page filtering conditions for the time period designated in step S1203.

In step S1206, the setting control unit 1002 stores the setting information in the HDD 203 via the file operation unit 1005. The processing to be performed in step S1206 is similar to the processing performed in step S103 illustrated in FIG. 5.

In step S1207, the setting control unit 1002 transmits, via the main control unit 1000, a setting information storage request to the image processing server 20. The storage request transmitted in this case is accompanied by required setting information, similar to step S104 illustrated in FIG. 5.

Figure 22:
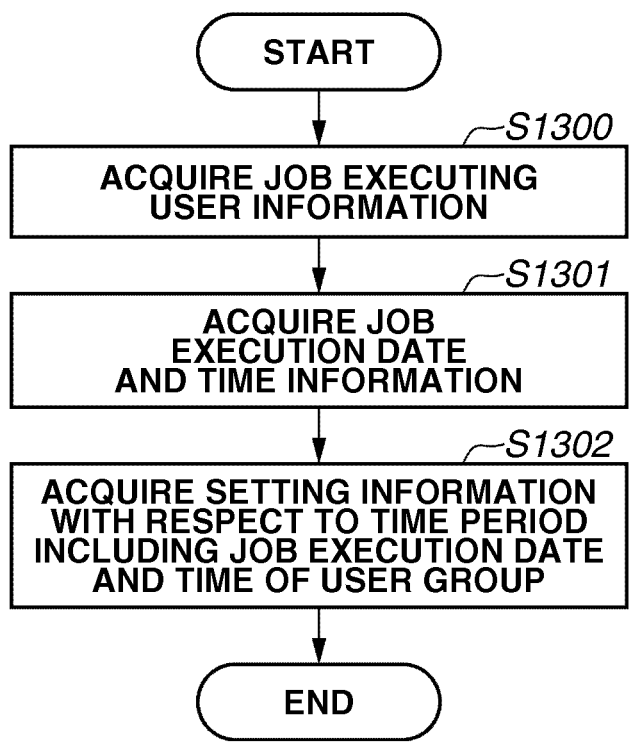
FIG. 22 is a flowchart illustrating an example procedure of setting information acquisition processing according to the third embodiment of the present invention.

FIG. 22 is a flowchart illustrating an example procedure of the setting information acquisition processing illustrated in FIG. 13 or FIG. 15 according to the present embodiment.

Hereinafter, an example flow of determination processing for selecting operational conditions (see FIG. 17) to be applied, in step S1000 or step S1100, when the page filtering is performed, based on a job executing user and job execution date and time information is described.

In step S1300, the job history information control unit 1004 acquires job executing user information from the job history information stored in the HDD 203 via the file operation unit 1005. In step S1301, the job history information control unit 1004 acquires job execution date and time information from the job history information stored in the HDD 203 via the file operation unit 1005.

In step S1302, the job history information control unit 1004 acquires operational conditions of the page filtering processing of the group to which the user belongs, from the setting information stored in the RAM 201 by the setting control unit 1002, via the main control unit 1000. Further, the job history information control unit 1004 acquires page filtering setting having the same job execution date and time.

As described above, according to the present embodiment, it is feasible to construct a flexible system that can store the setting information for each job executing group (or user) and can change a page filtering operation for each time period.

While the present invention has been described with reference to embodiments, it is to be understood that the invention is not limited to the disclosed embodiments. The scope of the following claims is to be accorded the broadest interpretation so as to encompass all modifications, equivalent structures, and functions.

This application claims priority from Japanese Patent Application No. 2010-227550 filed Oct. 7, 2010, which is hereby incorporated by reference herein in its entirety.

What is claimed is:

1. An auditing system that stores, using a data server, job history information of a job to be executed by an image forming apparatus, the auditing system comprising:
    a setting unit configured to set page filtering conditions, wherein the page filtering conditions include a ratio of a number of pages to be acquired as image data to a total number of pages included in a job to be executed by the image forming apparatus;
    a storing unit configured to generate and store, as the job history information, image data of all pages included in a job executed by an image forming apparatus;
    a decision unit configured to decide, in response to the ratio being set as the page filtering conditions, numbers to be included in a group, wherein a quantity of the numbers corresponds to the number of pages to be acquired as image data and values of the numbers are equal to or less than the total number of pages included in the job to be executed; and an acquisition unit configured to execute an acquisition process to acquire image data, wherein, in response to a transmission instruction for job history information, the acquisition unit execute the acquisition process to acquire, from the storing unit and as managed job history information to be managed by the data server, image data from pages included in the job whose page number corresponds to the numbers in the group, and wherein at least one of the setting unit and the acquisition unit is implemented by a processor.

2. The auditing system according to claim 1, wherein the decision unit decides random numbers to be included in the group and the acquisition unit executes the acquisition process to acquire image data from pages included in the job whose page number corresponds to the random numbers in the group.

3. The auditing system according to claim 1, wherein the setting unit is configured to set the page filtering conditions in association with at least one of (i) a group requesting execution of the job and (ii) a time period during which the job is executed.

4. A method for controlling an auditing system that stores, using a data server, job history information of a job to be executed by an image forming apparatus, the method comprising:

setting page filtering conditions, wherein the page filtering conditions include a ratio of a number of pages to be acquired as image data to a total number of pages included in a job to be executed by the image forming apparatus;

generating and storing, in a storing unit and as the job history information, image data of all pages included in a job executed by an image forming apparatus;

deciding, in response to the ratio being set as the page filtering conditions, numbers to be included in a group, wherein a quantity of the numbers corresponds to the number of pages to be acquired as image data and values of the numbers are equal to or less than the total number of pages included in the job to be executed; and executing an acquisition process to acquire image data, wherein, in response to a transmission instruction for job history information, executing includes executing the acquisition process to acquire, from the storing unit and as managed job history information to be managed by the data server, image data from pages included in the job whose page number corresponds to the numbers in the group.

5. The method according to claim 4, wherein deciding includes deciding random numbers to be included in the group and executing includes executing the acquisition process to acquire image data from pages included in the job whose page number corresponds to the random numbers in the group.

6. The method according to claim 4, wherein setting further includes setting the page filtering conditions in association with at least one of (i) a group requesting execution of the job and (ii) a time period during which the job is executed.

7. A non-transitory computer readable storage medium storing a program to cause a computer to perform a method for controlling an auditing system that stores, using a data server, job history information of a job to be executed by an image forming apparatus, the method comprising:

setting page filtering conditions, wherein the page filtering conditions include a ratio of a number of pages to be acquired as image data to a total number of pages included in a job to be executed by the image forming apparatus;

generating and storing, in a storing unit and as the job history information, image data of all pages included in a job executed by an image forming apparatus;

deciding, in response to the ratio being set as the page filtering conditions, numbers to be included in a group, wherein a quantity of the numbers corresponds to the number of pages to be acquired as image data and values of the numbers are equal to or less than the total number of pages included in the job to be executed; and executing an acquisition process to acquire image data, wherein, in response to a transmission instruction for job history information, executing includes executing the acquisition process to acquire, from the storing unit and as managed job history information to be managed by the data server, image data from pages included in the job whose page number corresponds to the numbers in the group.

8. The non-transitory computer readable storage medium according to claim 7, wherein deciding includes deciding random numbers to be included in the group and executing includes executing the acquisition process to acquire image data from pages included in the job whose page number corresponds to the random numbers in the group.

9. The non-transitory computer readable storage medium according to claim 7, wherein setting further includes setting the page filtering conditions in association with at least one of (i) a group requesting execution of the job and (ii) a time period during which the job is executed.

10. The auditing system according to claim 1, wherein the value of each number decided by the decision unit is represented by an integer value greater than zero (0).

11. The method according to claim 4, wherein the value of each number decided by the decision unit is represented by an integer value greater than zero (0).

12. The non-transitory computer readable storage medium according to claim 7, wherein the value of each number decided by the decision unit is represented by an integer value greater than zero (0).

* * * * *